US010938908B2

(12) United States Patent
Shim et al.

(10) Patent No.: US 10,938,908 B2
(45) Date of Patent: Mar. 2, 2021

(54) DISPLAY DEVICE AND VEHICLE HAVING THE SAME

(71) Applicant: LG ELECTRONICS INC., Seoul (KR)

(72) Inventors: Inkoo Shim, Seoul (KR); Sangwon Kim, Seoul (KR); Kihoon Lee, Seoul (KR); Byungju Lee, Seoul (KR); Ahreum Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 290 days.

(21) Appl. No.: 16/014,861

(22) Filed: Jun. 21, 2018

(65) Prior Publication Data

US 2019/0149607 A1    May 16, 2019

(30) Foreign Application Priority Data

Nov. 13, 2017 (KR) .................. 10-2017-0150717

(51) Int. Cl.
  *B60K 37/02*    (2006.01)
  *B60K 35/00*    (2006.01)
  (Continued)

(52) U.S. Cl.
  CPC .............. *H04L 67/12* (2013.01); *B60K 35/00* (2013.01); *B60K 37/02* (2013.01); *B60Q 3/14* (2017.02);
  (Continued)

(58) Field of Classification Search
  CPC ......... H04L 67/12; B60K 37/02; B60K 35/00; B60K 2370/1531; B60K 2370/334;
  (Continued)

(56) References Cited

U.S. PATENT DOCUMENTS

2014/0282182 A1    9/2014  Yamada
2015/0046022 A1*   2/2015  Bai .................. G07C 5/008
                                              701/31.5
(Continued)

FOREIGN PATENT DOCUMENTS

DE    112015003634 T5    4/2017
EP      3 476 644 A1     5/2019
(Continued)

*Primary Examiner* — Rexford N Barnie
*Assistant Examiner* — Elim Ortiz
(74) *Attorney, Agent, or Firm* — Birch, Stewart, Kolasch & Birch, LLP

(57) ABSTRACT

The present invention relates to a display device provided in a vehicle and performing communication with at least one processor provided in the vehicle. The display device includes a first display configured to output first light forming first visual information, a supporting unit configured to support a mobile terminal having a second display, and a light synthesizing unit configured to transmit either one of the first light and second light output from the second display and reflect another light, wherein the supporting unit is spaced apart from the first display with the light synthesizing unit interposed therebetween, and supports the mobile terminal so that the second light is directed to the light synthesizing unit.

29 Claims, 37 Drawing Sheets

(51) Int. Cl.
  *H04L 29/08* (2006.01)
  *B60Q 3/14* (2017.01)
  *B60Q 3/16* (2017.01)
  *F21V 8/00* (2006.01)
  *G06F 8/65* (2018.01)
  *H04M 1/60* (2006.01)

(52) U.S. Cl.
  CPC ............ *B60Q 3/16* (2017.02); *G02B 6/0021* (2013.01); *G06F 8/65* (2013.01); *H04M 1/60* (2013.01); *B60K 2370/1531* (2019.05); *B60K 2370/167* (2019.05); *B60K 2370/20* (2019.05); *B60K 2370/23* (2019.05); *B60K 2370/25* (2019.05); *B60K 2370/27* (2019.05); *B60K 2370/334* (2019.05); *B60K 2370/347* (2019.05); *B60K 2370/566* (2019.05)

(58) Field of Classification Search
  CPC ............ B60K 2370/27; B60K 2370/16; B60K 2370/20; B60K 2370/347; B60K 2370/23; B60K 2370/566; B60Q 3/14; B60Q 3/16; G02B 6/0021; G06F 8/65; H04M 1/60
  See application file for complete search history.

(56) References Cited

U.S. PATENT DOCUMENTS

| | | | |
|---|---|---|---|
| 2015/0379773 | A1 | 12/2015 | Konishi et al. |
| 2016/0231771 | A1 | 8/2016 | Chiu et al. |
| 2018/0164998 | A1* | 6/2018 | Fujita ................... B60K 11/085 |

FOREIGN PATENT DOCUMENTS

| | | |
|---|---|---|
| JP | 2009-192434 A | 8/2009 |
| JP | 2017-78668 A | 4/2017 |
| KR | 10-2001-0061774 A | 7/2001 |
| KR | 10-2005-0078162 A | 8/2005 |

* cited by examiner (a)

(b)

870

1300

1300

DISPLAY DEVICE AND VEHICLE HAVING THE SAME

CROSS-REFERENCE TO RELATED APPLICATION

Pursuant to 35 USC § 119 (a), this application claims the benefit of an earlier filing date and priority to Korean Application No. 10-2017-0150717, filed on Nov. 13, 2017, the contents of which are incorporated by reference herein in its entirety.

BACKGROUND OF THE INVENTION

1. Field of the Invention

The present invention relates to a display device capable of outputting driving information related to a vehicle, and a vehicle having the same.

2. Description of the Related Art

A vehicle refers to a means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

As the functions of the vehicle are diversified, various types of driving information are provided. The functions of the vehicle are classified into a convenience function and a safety function. Driving information for the safety function needs to be intuitively transmitted to the driver as compared with driving information for the convenience function. It is necessary to develop a display device capable of effectively transmitting various driving information according to a driving situation of the vehicle.

SUMMARY OF THE INVENTION

The present invention is directed to solving the above-mentioned problems and other drawbacks.

An aspect of the present invention is to provide a display device, capable of effectively transmitting various types of driving information, and a vehicle having the same. Specifically, the present invention provides a display device capable of generating a different sense of depth according to driving information to be displayed, and a vehicle having the same.

An aspect of the present invention is to provide a display device, capable of three-dimensionally providing driving information using not only a hardware configuration of a display but also an optical illusion effect by software, and a vehicle having the same.

The present invention relates to a display device provided in a vehicle and configured to perform communication with at least one processor provided in the vehicle.

The display device may include a first display configured to output first light forming first visual information, a supporting unit configured to support a mobile terminal having a second display, and a light synthesizing unit configured to transmit either one of the first light and second light output from the second display and reflect another light, wherein the supporting unit may be spaced apart from the first display with the light synthesizing unit interposed therebetween, and may support the mobile terminal so that the second light is directed to the light synthesizing unit.

According to one embodiment, the supporting unit may support a front surface of the mobile terminal so that the second display of the mobile terminal forms an acute angle with the light synthesizing unit.

According to one embodiment, the display device may further include a communication unit configured to perform communication with the mobile terminal. The communication unit may transmit a message to the mobile terminal so that the second visual information is output on the second display when the mobile terminal is mounted on the supporting unit.

According to one embodiment, the message may include vehicle driving information generated by the at least one processor provided in the vehicle.

According to one embodiment, the communication unit may selectively transmit the message according to a direction that the second display faces when the mobile terminal is mounted on the supporting unit.

According to one embodiment, the display device may further include a sensor configured to sense a mounting area where the mobile terminal is mounted on the supporting unit.

According to one embodiment, an information output permissible area for outputting the second visual information, of an entire area of the second display, may be calculated differently depending on the mounting area. The communication unit may transmit information corresponding to the information output permissible area to the mobile terminal so that the second visual information is output in the information output permissible area.

According to one embodiment, the first display may provide preset information in a three-dimensional manner in cooperation with the second display when the mobile terminal is mounted on the supporting unit, and an output area of the preset information on the first display may vary according to the mounting area.

According to one embodiment, the communication unit may transmit a different message to the mobile terminal so that at least one of an output position and an output size of the second visual information output on the second display varies according to the mounting area.

According to one embodiment, the communication unit may transmit a different message to the mobile terminal so that the second visual information output on the second display varies according to the mounting area.

According to one embodiment, the second visual information output on the second display may vary according to a direction that one end of the mobile terminal mounted on the supporting unit faces.

According to one embodiment, the light synthesizing unit may include first and second light synthesizing portions spaced apart from each other. At least one of a first area corresponding to first information, of first and second information to be output on the mobile terminal, and a second area corresponding to the second information, of an entire area of the second display, may be calculated based on the mounting area so that the first information is reflected by the first light synthesizing portion and the second information is reflected by the second light synthesizing portion. The communication unit may transmit information related to the calculated at least one to the mobile terminal.

According to one embodiment, the first visual information output on the first display when the second visual information is output on the second display may vary according to a position where the mobile terminal is mounted on the supporting unit.

According to one embodiment, the display device may further include a driving unit having a rotation shaft for providing power. The light synthesizing unit may be coupled to the rotation shaft so as to be tilted between the first display and the supporting unit. The driving unit may be driven so that a reference angle between the light synthesizing unit and the first display is changed according to the mounting area.

According to one embodiment, the communication unit may transmit a variable message to the mobile terminal so that at least one of an output position and an output size of the second visual information output on the second display varies according to reference angle.

According to one embodiment, the first display may output guide information for guiding a position of the mobile terminal to be moved when the mounting area fails to satisfy a predetermined condition.

According to one embodiment, the display device may further include a processor configured to control the first display to output third visual information corresponding to an event, and control the communication unit such that fourth visual information corresponding to the event is output on the second display, when the event occurs while the first visual information is output on the first display and the second visual information is output on the second display.

According to one embodiment, the communication unit may transmit a variable message to the mobile terminal so that at least one of an output position and an output size of the second visual information on the second display varies according to speed of the vehicle.

According to one embodiment, the display device may further include a fixing unit configured to fix the mobile terminal mounted on the supporting unit.

According to one embodiment, the fixing unit may be configured to apply an external force to the mobile terminal so that the mobile terminal mounted on the supporting unit is moved to a predetermined position and fixed thereto.

According to one embodiment, at least part of the supporting unit brought into contact with the second display of the mobile terminal may be made transparent.

According to one embodiment, the display device may further include a cover configured to open and close at least part of the supporting unit so that external light is prevented from being incident on the light synthesizing unit through the supporting unit.

According to one embodiment, the display device may further include a power supply unit configured to supply power to the mobile terminal when the mobile terminal is mounted on the supporting unit.

According to one embodiment, the first display may additionally output information related to the mobile terminal on the first visual information based on information received from the mobile terminal when the power supply unit supplies power to the mobile terminal.

The present invention also provides a control method of an application for controlling at least one of the display device and the mobile terminal described above.

The control method may include sensing whether the mobile terminal is mounted on a supporting unit of the display device using a sensor provided in the at least one, and controlling at least one of the mobile terminal and the display device so that the display device and the mobile terminal cooperatively provide preset vehicle driving information in a three-dimensional manner when the mobile terminal is mounted on the supporting unit.

According to one embodiment, the controlling the at least one may include transmitting a first message to the display device such that a part of the vehicle driving information is output on the first display, and transmitting a second message to the mobile terminal such that another part of the vehicle driving information is output on the second display.

According to one embodiment, the control method may further include selecting an information output permissible area from an entire area of the second display based on a mounting area where the mobile terminal is mounted on the supporting unit. The another part of the vehicle driving information may be output in the selected information output permissible area.

According to one embodiment, the control method may further include selecting an information output permissible area from an entire area of the first display based on a mounting area where the mobile terminal is mounted on the supporting unit. The part of the vehicle driving information may be output in the selected information output permissible area.

According to one embodiment, the control method may further include controlling the second display to be turned on or off according to a direction that the second display faces when the mobile terminal is mounted on the supporting unit.

According to one embodiment, the light synthesizing unit may be configured to be tilted between the first display and the supporting unit. The control method may further include adjusting a reference angle between the light synthesizing unit and the first display according to the mounting area where the mobile terminal is mounted on the supporting unit.

Further, the present invention can extend even to a vehicle having the display device and/or a method of controlling the vehicle.

Hereinafter, effects of a display device and a vehicle having the same according to the present invention will be described.

The display device can produce an effect of changing at least one of an output size and an output position of information displayed on the second display by adjusting the reference angle.

According to one embodiment, when there is an object with possibility of collision, notification information for notifying the object can be provided in a two-dimensional manner through a first graphic object or in a three-dimensional manner through a second graphic object according to the possibility of collision. Furthermore, since the first angle of the light synthesizing unit varies according to the possibility of collision, the notification information can be more effectively transmitted to passengers.

According to one embodiment, the second display can be divided into a first portion and a second portion, and a first graphic object can be displayed on the first portion and a second graphic object on the second portion. The first graphic object has a first depth value by the first light synthesizing portion and the second graphic object has a second depth value by the second light synthesizing. At this time, the display device can adjust respective output positions of the first and second graphic objects so that the first and second graphic objects have the same depth value. This may allow different graphic objects having the same depth value to be displayed on upper and lower portions of the first display, respectively.

The second light reflected by the first light synthesizing portion and the third light reflected by the second light synthesizing portion can be output from one display. In this case, although a product size may increase due to the second display and the reflection unit, the second display may serve as a shielding film for blocking external light introduced into the first display. The display device can also adjust depth of a graphic object formed on the second light synthesizing portion by tilting the reflection unit, and can provide an optimized user interface according to a vehicle driving situation using the tilting of the second light synthesizing portion.

According to the present invention, the second display can be replaced with a touch screen provided in the mobile terminal. The display device provides an optimal user interface because various types of information are provided in a two-dimensional or three-dimensional manner according to whether the mobile terminal is mounted.

The use of a mobile terminal during driving is prohibited. However, since the display device according to the present invention uses the mobile terminal as one component of a dashboard display, a new function is given to the mobile terminal, and a new effect of physically extending a display of the vehicle is provided.

In addition, an optimal user interface is provided according to the mounting area where the mobile terminal is mounted on the supporting unit. The user can be provided with an optimal user interface according to a situation simply by mounting his or her terminal on the supporting unit without changing settings separately.

BRIEF DESCRIPTION OF THE DRAWINGS

FIGS. 22A and 2B are flowcharts illustrating the control method of FIG. 21.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
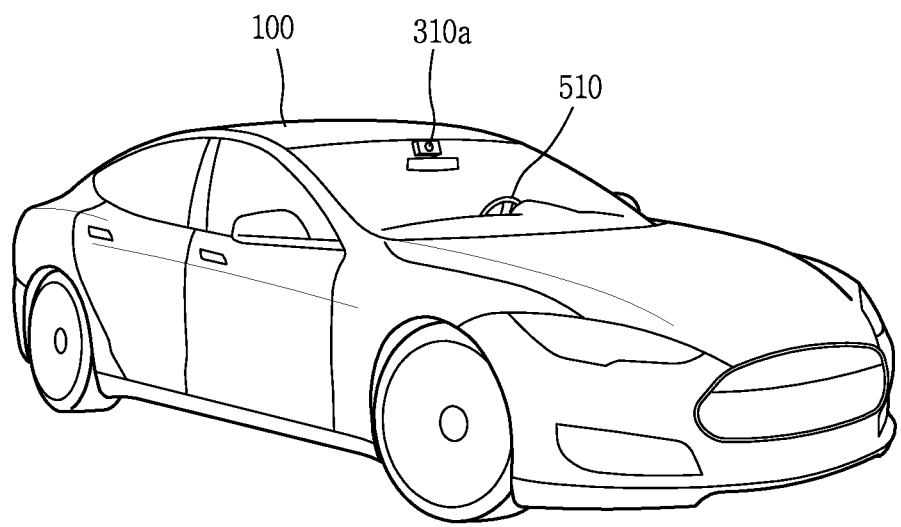
FIG. 1 is a view illustrating appearance of a vehicle in accordance with an embodiment of the present invention.
Figure 1:
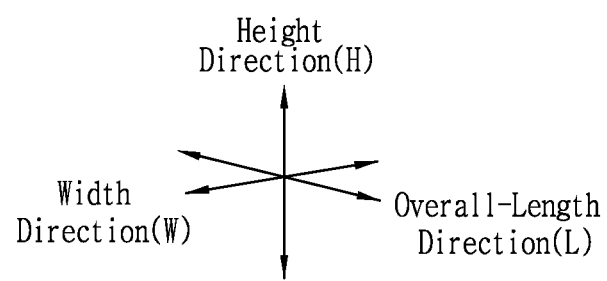

FIG. 1 is a view illustrating appearance of a vehicle in accordance with an embodiment of the present invention.

Figure 2:
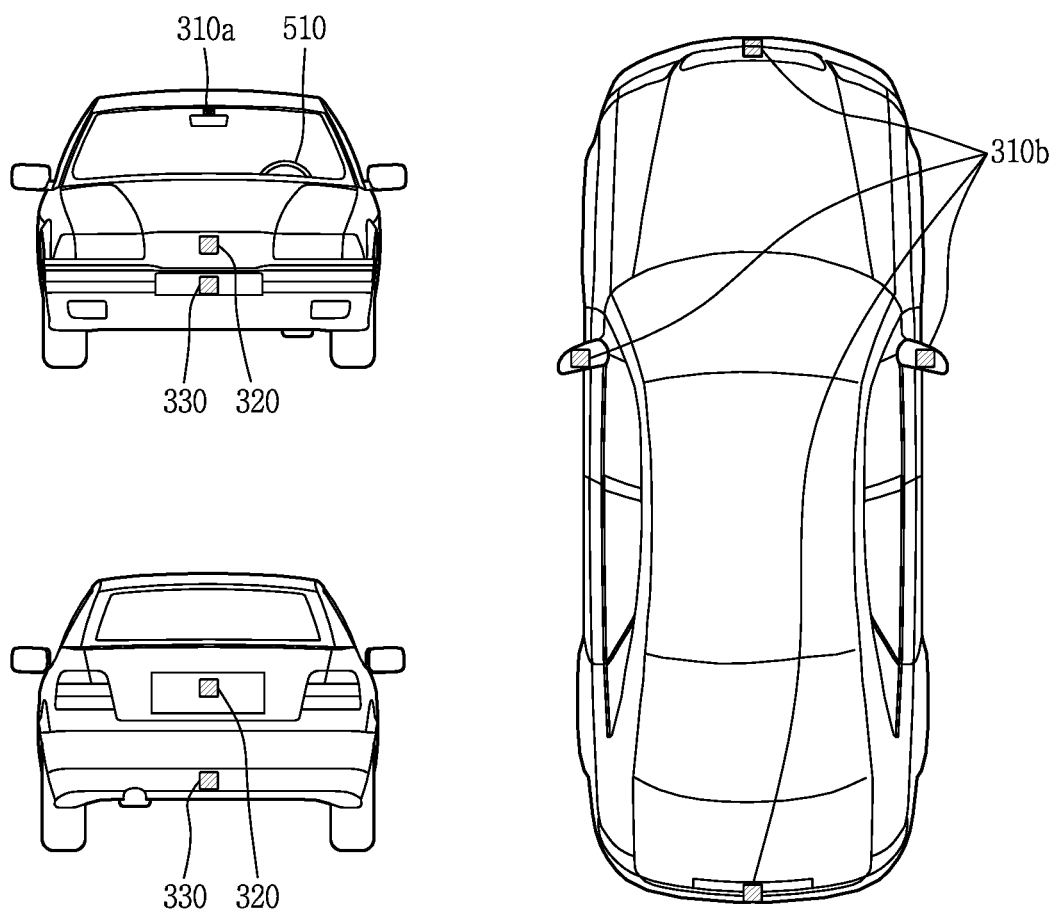
FIG. 2 is a view illustrating appearance of a vehicle at various angles in accordance with an embodiment of the present invention.

FIG. 2 is a view illustrating appearance of a vehicle at various angles in accordance with an embodiment of the present invention.

Figure 3:
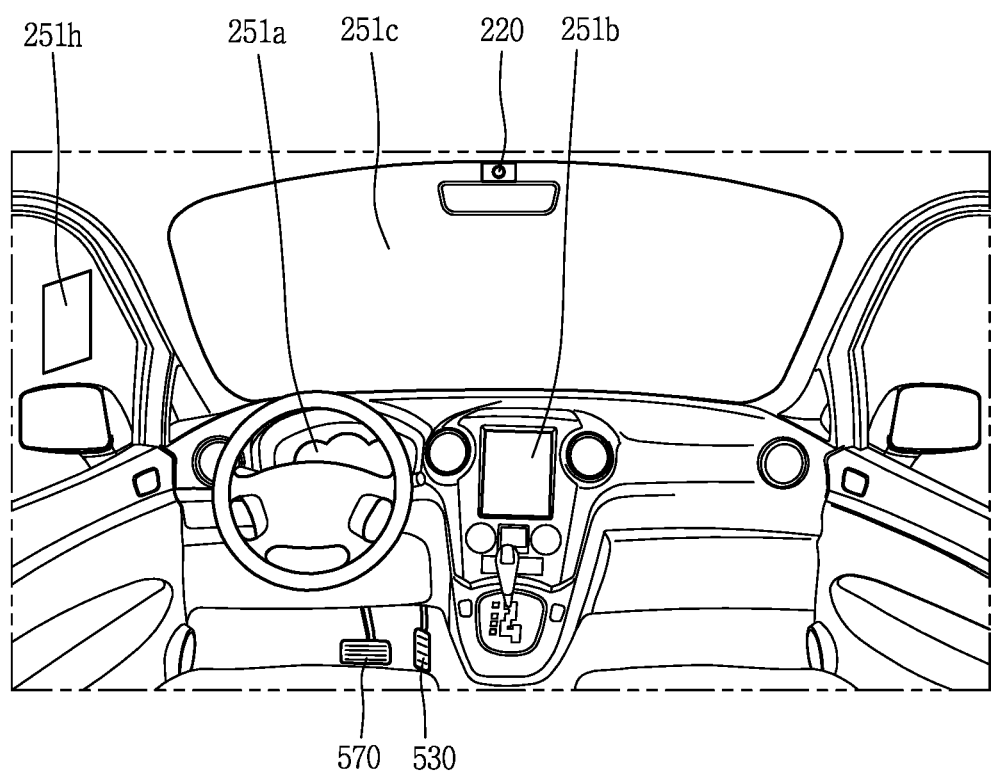
FIGS. 3 and 4 are views illustrating an inside of a vehicle in accordance with an embodiment of the present invention.
Figure 4:
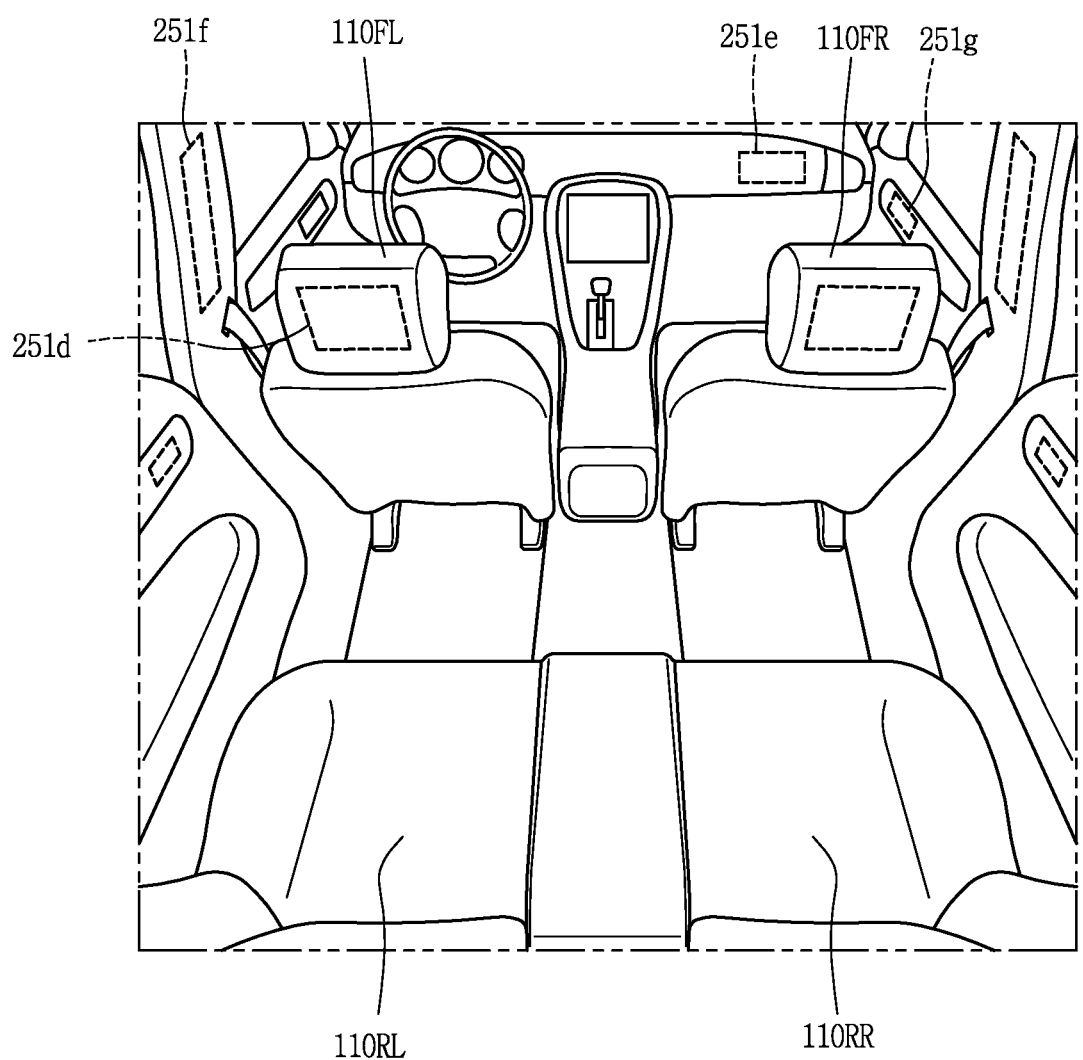

FIGS. 3 and 4 are views illustrating an inside of a vehicle in accordance with an embodiment of the present invention.

Figure 5:
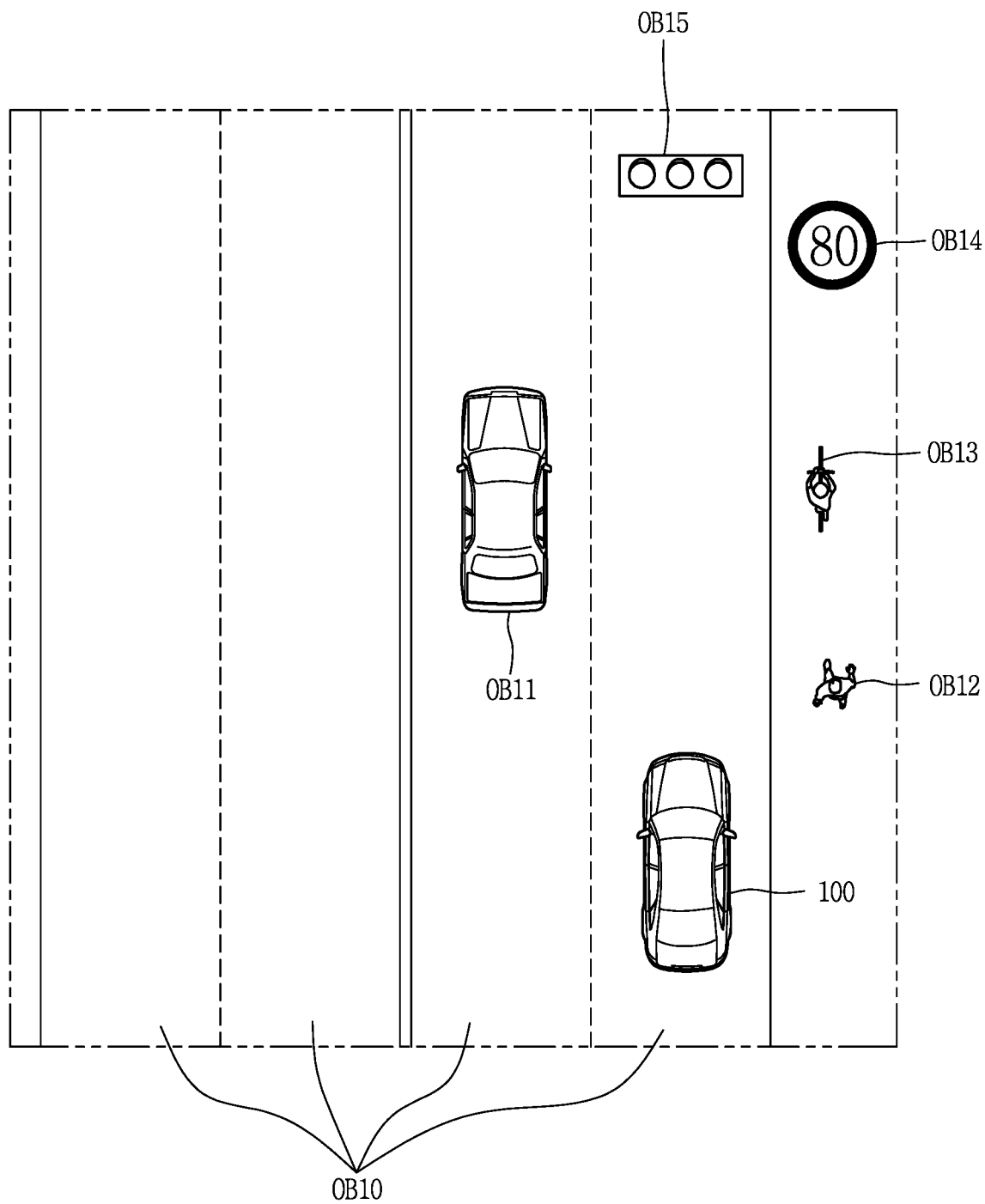
FIGS. 5 and 6 are reference views illustrating objects in accordance with an embodiment of the present invention.
Figure 6:
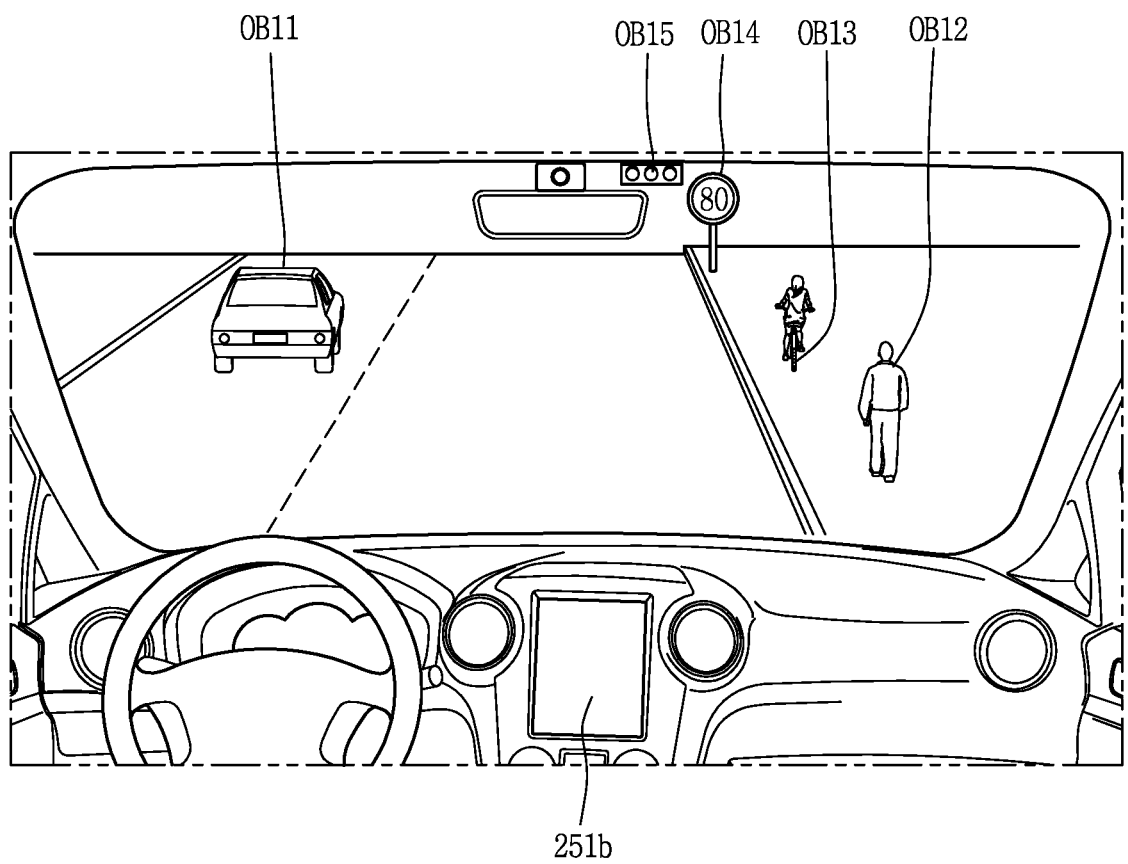

FIGS. 5 and 6 are reference views illustrating objects in accordance with an embodiment of the present invention.

Figure 7:
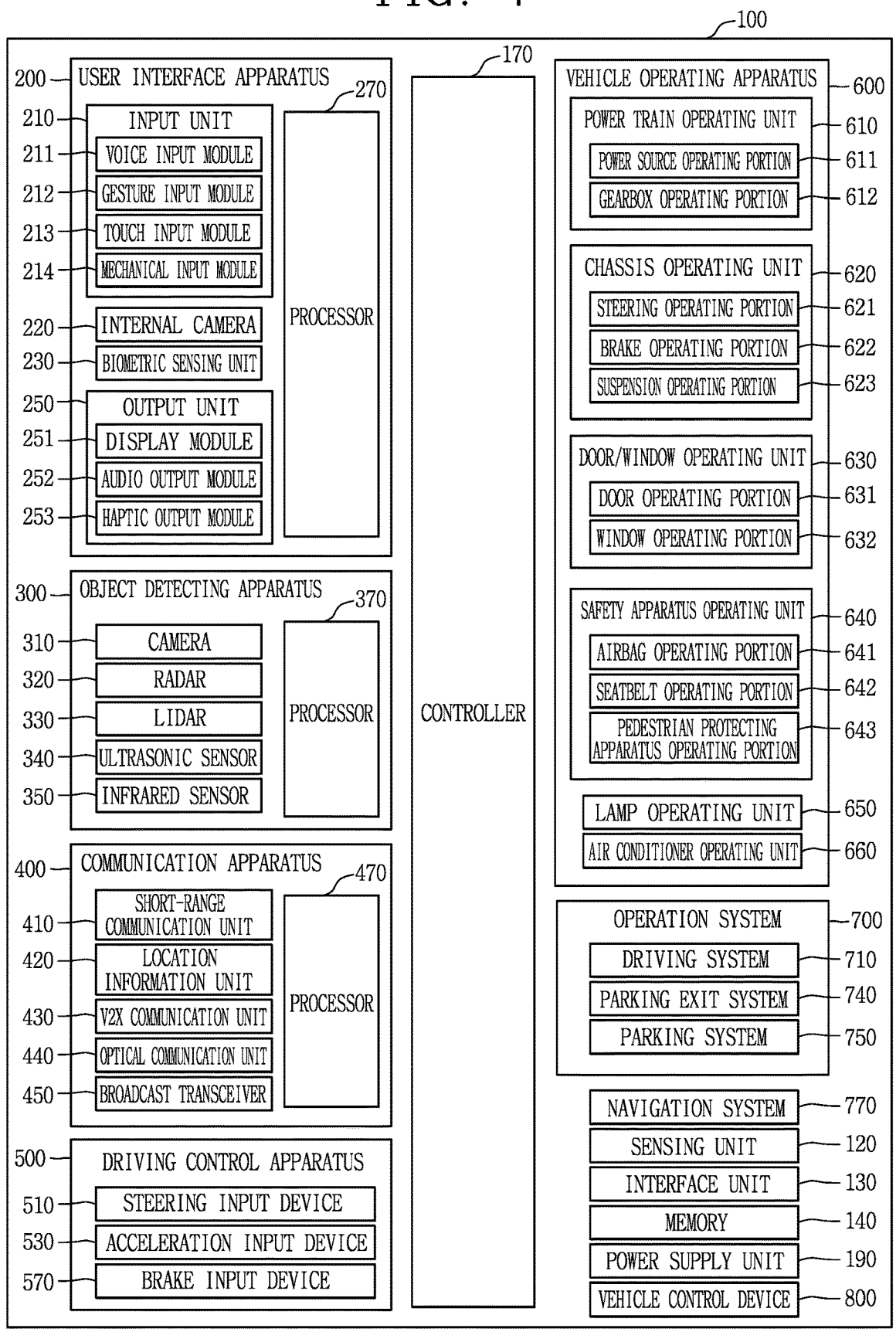
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

Here, the autonomous driving is defined as controlling at least one of acceleration, deceleration, and driving direction based on a preset algorithm. In other words, the autonomous driving refers to that a driving control apparatus is automatically manipulated even without a user input applied to the driving control apparatus.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 200 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a 'wireless communication unit'.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, a display device 800 provided in the vehicle 100 will be described in detail.

The display device 800 is provided in the vehicle 100, and may be implemented as an independent device detachable from the vehicle 100 or as a part of the vehicle 100 which is integrally installed in the vehicle 100. The display device may refer to the display unit 271 described above with reference to FIG. 7.

Hereinafter, for the sake of explanation, description will be given of an example that the display device 800 is a separate component independent of the display unit 271 of the vehicle 100. However, this is only an embodiment of the present invention, and all the operation and control method of the display device 800 described in this specification may alternatively be performed by the controller 170 of the vehicle 100. That is, the operation and/or control method performed by a processor 860 of the display device 800 may be performed by the controller 170 of the vehicle 100.

The present invention will illustrate an example in which the display device 800 is a cluster that is disposed at a driver's seat and provides various types of vehicle driving information to the driver. However, the present invention is not limited thereto. For example, the display device 800 may be disposed at various locations within the vehicle 100 to provide various information.

Figure 8A:
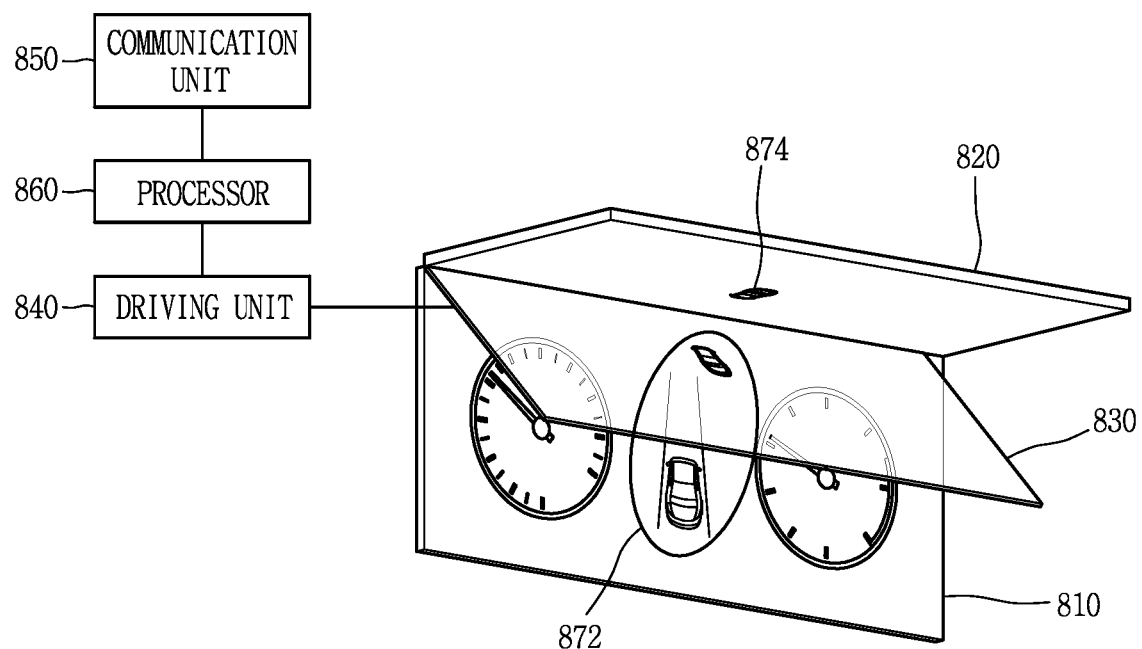
FIG. 8A is a block diagram illustrating a display device according to one embodiment of the present invention.
Figure 8B:
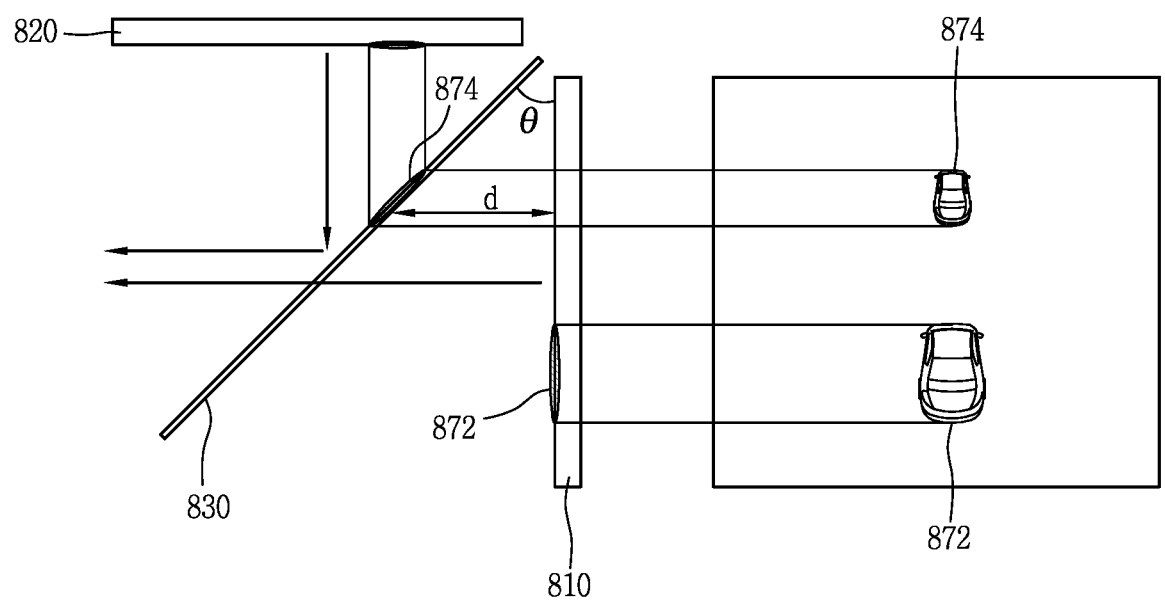
FIG. 8B is a side view and a front view of the display device of FIG. 8A.

FIG. 8A is a conceptual view illustrating a display device according to one embodiment of the present invention, and FIG. 8B is a side view and a front view of the display device 800 of FIG. 8A.

Referring to FIG. 8A, the display device 800 may include at least one of a communication unit 850, a first display 810, a second display 820, a light synthesizing unit 830, a processor 860, and a driving unit 840.

The communication unit 850 is configured to perform communication with the various components described in FIG. 7. For example, the communication unit 850 may receive various information provided through a controller area network (CAN). In another example, the communication unit 850 may perform communication with all devices capable of performing communication, such as a vehicle, a mobile terminal, a server, and another vehicle. This may be referred to as Vehicle to everything (V2X) communication. The V2X communication may be defined as technology of exchanging or sharing information, such as traffic condition and the like, while communicating with a road infrastructure and other vehicles during driving.

The communication unit 850 may receive information related to the driving of the vehicle from most of devices provided in the vehicle 100. The information transmitted from the vehicle 100 to the display device 800 is referred to as 'vehicle driving information (or vehicle travel information)'.

The vehicle driving information includes vehicle information and surrounding information related to the vehicle. Information related to the inside of the vehicle based on the frame of the vehicle 100 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may include ambient brightness, temperature, a position of the sun, information related to nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information may further include a distance from an object existing around the vehicle to the vehicle 100, collision possibility, a type of an object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 100.

The first and second displays 810 and 820 may output various information under the control of the processor 860 provided in the display device 800. For example, the first display 810 may output first light that forms first visual information, and the second display 820 may output second light that forms second visual information. The first and second visual information may relate to the aforementioned vehicle driving information.

The displays 810 and 820 may include at least one of a liquid crystal display (LCD), a thin film transistor-LCD (TFT LCD), an organic light-emitting diode (OLED), a flexible display, a three-dimensional (3D) display, and an e-ink display.

The first display 810 may be oriented toward a first direction and the second display 820 may be oriented toward a second direction that is perpendicular to the first direction. The second direction may indicate a direction forming an angle of a predetermined range approximately perpendicular to the first direction.

The first direction may be a direction facing driver's eyes when the driver is seated in the driver's seat, and the second direction may be a direction having a predetermined first angle with respect to the first direction. In one example, the second direction may be a gravitational direction.

According to the arrangement of the first and second displays 810 and 820, the first display 810 enters the driver's view but the second display 820 is out of the driver's view when the driver is seated in the driver's seat.

The light synthesizing unit 830 is located on an advancing path of each of the first light and the second light. Specifically, the light synthesizing unit 830 forms a first acute angle with the first display 810 and a second acute angle with the second display 820. The first acute angle and the second acute angle may be the same angle or different angles.

One end of the light synthesizing unit 830 may be located adjacent to the first and second displays 810 and 820. The light synthesizing unit 830 may be arranged between the first and second displays 810 and 820 in a manner of getting farther away from the first and second displays 810 and 820 from one end of the light synthesizing unit 830 toward another end of the light synthesizing unit 830.

The light synthesizing unit 830 allows the first light to transmit therethrough and reflect the second light between the first and second displays 810 and 820 so that the first light and the second light are directed to the same path. In other words, the light synthesizing unit 830 synthesizes the first light and the second light so that the first light and the second light can be directed to the same optical path.

The light synthesizing unit 830 may be a mirror such as a dichroic mirror.

The second light generated in the second display 820 arranged to face the second direction is synthesized with the first light by the light synthesizing unit 830 to form synthesized light, which proceeds toward the first direction.

For example, as illustrated in FIG. 8A, a first graphic object 872 may be output on the first display 810, and a second graphic object 874 may be output on the second display 820.

The first light corresponding to the first graphic object 872 is transmitted through the light synthesizing unit 830 without being reflected by the light synthesizing unit 830, so as to be intuitively perceived or recognized as being output from the first display 810. This is because the light synthesizing unit 830 is made transparent.

On the other hand, since the second light corresponding to the second graphic object 874 is reflected by the light synthesizing unit 830, the user may recognize that the second visual information is being displayed on the light synthesizing unit 830.

Referring to FIG. 8B, the user recognizes that the first graphic object 872 is located on the first display 810 and the second graphic object 874 is located on the light synthesizing unit 830. Accordingly, the first and second graphic objects 872 and 874 may have a distance therebetween as far as a distance d between the light synthesizing unit 830 and the first display 810.

The user may perceive the first and second graphic objects 872 and 874 as the second graphic object 874 is located above the first graphic object 872. The user may perceive the first and second graphic objects 872 and 874 as the second graphic object 874 is located closer to him/her than the first graphic object 872, or the first graphic object 872 is located farther away from him/her than the second graphic object 874. That is, the user may feel three-dimensional (3D) depth due to the difference in position between the light synthesizing unit 830 and the first display 810.

Information output on each display may obtain 3D depth when the first visual information is displayed on the first display 810 and the second visual information is displayed on the second display 820 at the same time.

Here, 'sense of depth' or 'depth value' refers to an index indicating a difference in distance between a virtual one point and an object displayed on the display device 800. A depth value of an object may be defined as "0" when the object displayed on the display device 800 is located at a predetermined point. A depth value of an object which seems to have a shape protruding from the predetermined point to outside of the display device 800 may be defined as a negative value, and a depth value of an object which seems to have an inwardly concave (recessed) shape may be defined as a positive value. It may be construed that the object is farther away from the predetermined point when an absolute value of the depth value is larger.

The depth value disclosed in the present invention is generated by the distance difference between the first display and the light synthesizing unit and may be defined as a perpendicular distance from a reference surface to the light synthesizing unit when the first display is used as the reference surface.

Although the same graphic object is displayed in the same size, it may have a different depth value according to an output position on the second display 820. This is because the light synthesizing unit 830 is positioned between the first and second displays 810 and 820 and one surface of the light synthesizing unit 830 forms a first angle θ with the first display 810.

Hereinafter, the angle between the light synthesizing unit 830 and the first display 810 is defined as a 'first angle'.

If no information is displayed on the second display 820, the user is provided with information displayed on the first display 810 in a two-dimensional (2D) form.

On the other hand, when information is displayed on the second display 820, all information displayed on the first and second displays 810 and 820 may be provided in a three-dimensional (3D) form. Due to the difference in position between the light synthesizing unit 830 and the first display 810, the information displayed on the second display 820 has a different depth value depending on its output position.

The processor 860 is configured to control at least one of the first and second displays 810 and 820.

Specifically, the processor 860 may determine whether or not at least one of a plurality of preset conditions is satisfied, based on vehicle driving information received through the communication unit 850. The processor 860 may control at least one of the first and second displays 810 and 820 in a different way, so as to output information corresponding to the satisfied condition.

In connection with the preset conditions, the processor 860 may detect an occurrence of an event in an electric component and/or application provided in the vehicle 100, and determine whether the detected event meets the preset condition. At this time, the processor 860 may detect the occurrence of the event from the information received through the communication unit 810.

The application is a concept including a widget, a home launcher, and the like, and refers to all types of programs that can be run on the vehicle 100. Accordingly, the application may be a program that performs a function of a web browser, a video playback, a message transmission/reception, a schedule management, or an application update.

Further, the application may include a forward collision warning (FCW), a blind spot detection (BSD), a lane departure warning (LDW), a pedestrian detection (PD) A Curve Speed Warning (CSW), and a turn-by-turn navigation (TBT).

For example, the event occurrence may be a missed call, presence of an application to be updated, a message arrival, start on, start off, autonomous driving on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For example, the occurrence of the event may be a generation of forward collision warning, a generation of a blind spot detection, a generation of lane departure warning, a generation of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 100 perform specific functions, it may be determined as the occurrence of the event.

When the occurred event satisfies a preset condition, the processor 860 controls the first display 810 and/or the second display 820 to output information corresponding to the satisfied condition.

When an event occurs, information related to the occurred event needs to be provided to the passenger of the vehicle 100. At this time, the information displayed on the first display 810 and the information displayed on the second display 820 are distinguished from each other.

For example, general information to be provided to a passenger may be displayed on the first display 810 as main information, and sub information for emphasizing the main information may be displayed on the second display 820.

In another example, the first display 810 may output the vehicle driving information, and the second display 820 may output a graphical object associated with the vehicle driving information.

In another example, when a preset condition is satisfied while predetermined visual information is output on the first display 810, the processor 860 may move the predetermined visual information to the second display 820. In other words, the predetermined visual information which is being output on the first display 810 may disappear from the first display 810 and then output on the second display 820.

The processor 860 may display a graphic object corresponding to the vehicle driving information on the second display 820.

The graphic object corresponding to the vehicle driving information is for emphasizing information displayed on the first display 810, and may differ according to the information displayed on the first display 810. As another example, the graphic object may become a different graphic object depending on a type of event occurred. Here, the different graphic object, for example, may refer to an image having a different shape, length, color, or the like.

The type of the graphic object displayed on the second display 820 may vary according to the vehicle driving information displayed on the first display 820.

An output position of the graphic object on the second display 820 may vary depending on a driving situation of the vehicle. Here, the driving situation may relate to at least one of a position, acceleration, a running speed, and a running direction of the vehicle 100, and collision possibility with an external object.

Since the vehicle is premised on movement, information provided in the vehicle has its own position data. For example, route guidance information has position data of a point for which a route guidance should be provided, and object information having possibility of collision has position data of a point where the object is located.

When displaying information with position data, it is important to effectively inform a passenger of a point corresponding to the position data. The display device 800 according to the present invention can effectively guide the point using the light synthesizing unit 830, which is disposed tilted to have a predetermined angle with respect to the first display 810.

Specifically, the processor 860 of the display device 800 may adjust the output position of the information to have a different depth value depending on how far the point is away from the vehicle 100. This is because even the same information has a different depth value according to where (on which point) it is output on the second display 820.

For example, when the point is located within a first distance range, information to guide the point is output at a position away from one end of the second display 820 by a first distance. On the other hand, when the point is located within a second distance range, the information to guide the point may be output at a position away from the one end of the second display 820 by a second distance farther than the first distance. The passenger intuitively recognizes how far the point is located since the depth value differs according to the output position.

Hereinafter, various embodiments in which the processor 860 outputs information having 3D depth using the second display 820 will be described with reference to the accompanying drawings.

Figure 8C:
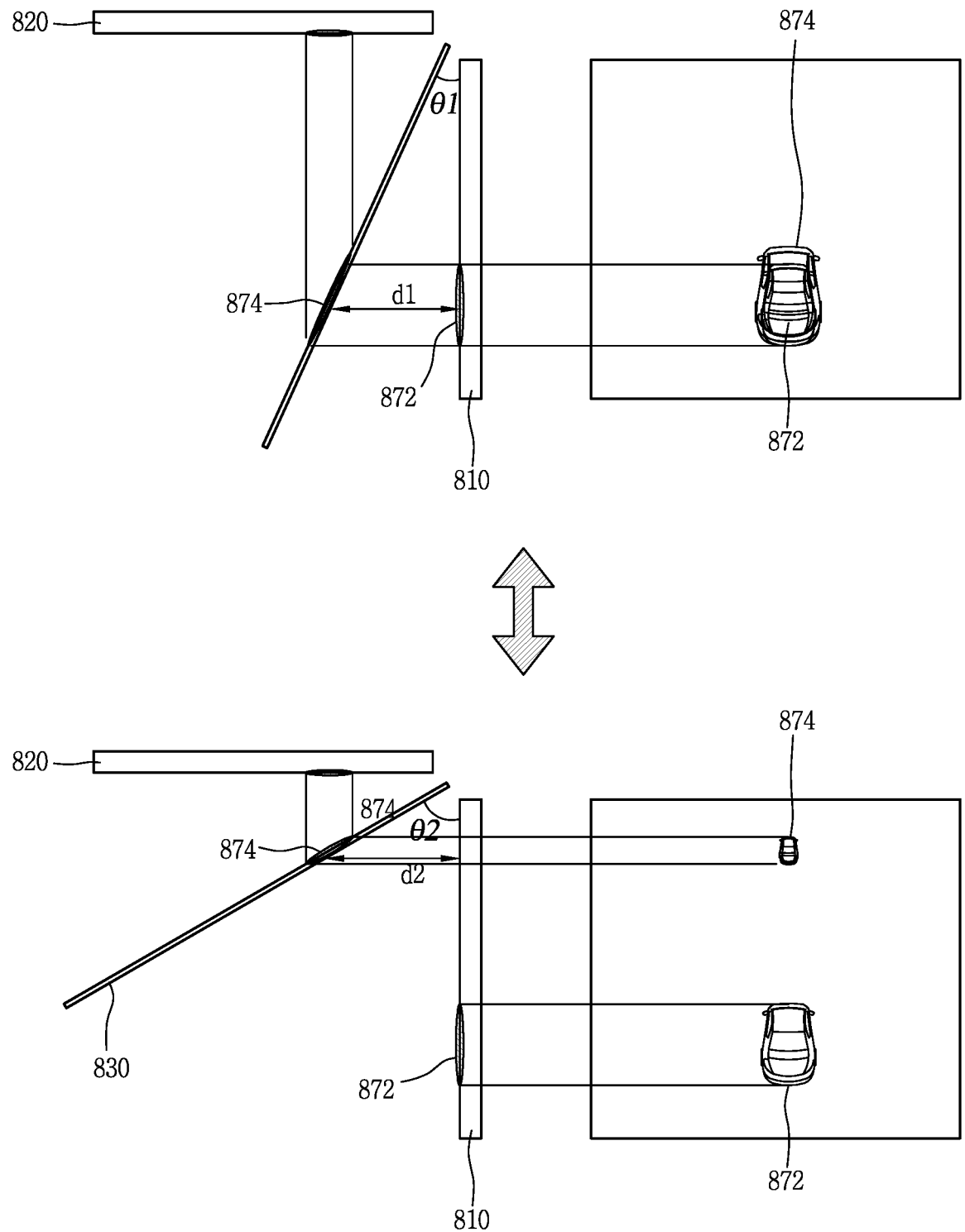
FIG. 8C is an exemplary view illustrating a change in three-dimensional depth according to tilting of a light synthesizing unit.

Meanwhile, FIG. 8C is an exemplary view illustrating a change in 3D depth according to tilting of the light synthesizing unit.

In the display device 800 according to the present invention, the light synthesizing unit 830 may be tilted so that the reference angle between the light synthesizing unit 830 and the first display 810 varies.

The driving unit 840 may include a rotation shaft for providing power and the light synthesizing unit 830 may be coupled to the rotation shaft to be tilted between the first and second displays 810 and 820.

More specifically, the processor 860 controls the driving unit 840 such that the first angle is varied to a predetermined angle corresponding to a preset condition in response to the preset condition being satisfied.

Specifically, when a preset condition is satisfied based on vehicle driving information received through the communication unit 850, the processor 860 may control the driving unit 840 accordingly. For example, the driving unit 840 may be controlled such that the reference angle is changed to a first angle when the first condition is satisfied, and controlled such that the reference angle is changed to a second angle when the second condition is satisfied.

As the driving unit 840 is driven, the light synthesizing unit 830 rotates and accordingly the first angle between the light synthesizing unit 830 and the first display 810 changes according to the rotation.

Meanwhile, even when the same graphic object is output on the second display 820, at least one of an output position and an output size of the graphic object recognized by the user is varied according to the first angle.

Here, the output position and the output size indicate the position and size displayed on the second display 820. On the other hand, information output on the second display 820 has an effect of being output on the first display 810 by being reflected by the light synthesizing unit 830. Thus, the output position and the output size may refer to a position and size on the first display 810 recognized by the user.

That is, even if the output position and the output size are the same, at least one of the output position and the output size may vary according to the first angle.

For example, as illustrated in FIG. 8C, the first graphic object 872 may be output on the first display 810, and the second graphic object 874 may be output on the second display 820.

The first and second graphic objects 872 and 874 may overlap each other at a first angle θ1. In this case, when the output size of the second graphic object 874 is defined as a first size, the second graphic object 874 has a first depth value d1.

On the other hand, the first and second graphic objects 872 and 874 may be output at different positions at a second angle θ2. At this time, the output size of the second graphic object 874 may be a second size, and the second graphic object 874 may have a second depth value d2.

The processor 860 may adjust the first angle so as to produce an effect of changing at least one of the output size and the output position of the information output on the second display 820. For example, when the tilting of the light synthesizing unit 830 is changed from the second angle θ2 to the first angle θ1, an effect that the second graphic object 874 gradually moves toward the first graphic object 872 is generated. Since the depth of the second graphic object 874 varies accordingly, a stereoscopic effect is generated.

The processor 860 may change the first angle according to the vehicle driving information.

In this case, the output position and the output size of the second graphic object 874 may change according to the first angle, in order to change only the 3D depth value of the second graphic object 874 in a state where the output position of the second graphic object 874 output on the second display 820 is fixed on the first display 810.

In order to generate various effects, at least one of the output position and the output side of the second graphic object 874 may also be changed at the same time of changing the first angle.

Accordingly, the processor can change at least one of the output size and the output position of the information currently output on the second display 820 by varying the first angle while maintaining the information.

Also, at least one of the output size and the output position of the information currently output on the second display 820 can be changed while maintaining the first angle.

In addition, at least one of the output size and the output position of the information currently output on the second display 820 can be changed while varying the first angle.

By the operation of the processor 860, various types of information can be output in a 3D manner having different depth values. The display device 800 according to the present invention may provide 3D vehicle driving information to a passenger according to one of various embodiments.

Hereinafter, the control method of the processor 860 will be described in more detail based on the structure of the display device 800, with reference to the accompanying drawings.

Figure 9:
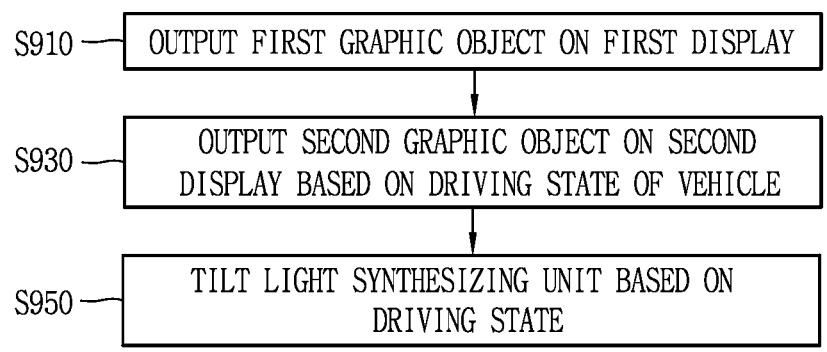
FIG. 9 is a flowchart illustrating a method of controlling a display device in accordance with the present invention.

FIG. 9 is a flowchart illustrating a method of controlling a display device according to the present invention.

First visual information may be displayed on the first display 810 according to vehicle driving information. For example, the first visual information may include a speedometer, an odometer, a tachometer, various warning lights, turn signal indicators, a fuel meter, event information for guiding an event occurring in the vehicle 100, and the like.

The second display 820 may be selectively turned on/off even when the first display 810 is turned on. For example, when a stereoscopic display mode is turned off in the vehicle 100, the second display 820 may be kept off. In another example, even when the stereoscopic display mode is turned on, the second display 820 may be kept off when there is no information to be provided to a passenger in a 3D manner.

Here, the stereoscopic display mode is defined as a state in which different types of information have different depth values and are output in a 3D manner through the light synthesizing unit 830 in a way of simultaneously outputting the different types of information on the first and second displays 810 and 820.

The light synthesizing unit 830 is formed to be tiltable, but may operate differently depending on whether the stereoscopic display mode is on or off. For example, when the stereoscopic display mode is turned on, the light synthesizing unit 830 is tilted in response to a preset condition being satisfied. However, when the stereoscopic display mode is turned off, the light synthesizing unit 830 is not tilted even when the preset condition is satisfied. The processor 860 controls the driving unit such that the light synthesizing unit 830 is not tilted even though the preset condition is satisfied when the stereoscopic display mode is turned off in the vehicle 100.

When the second display 820 is turned off, the light synthesizing unit 830 may be tilted such that the first angle has an initial setting value.

The second display 820 may output, as second visual information, information for emphasizing at least part of the first visual information displayed on the first display 810 and/or predetermined information to be guided to a passenger in a 3D manner regardless of the first visual information.

Various visual information may be displayed on the first and second displays 810 and 820. However, for convenience of explanation, the display device 800 according to the present invention will be described based on an example in which a first graphic object is displayed on the first display 810 and a second graphic object is displayed on the second display 820. However, the present invention is not limited to the first and second graphic objects, and a plurality of graphic objects may alternatively be displayed on or disappear from at least one of the first and second displays 810 and 820 according to the control of the processor 860.

First, the processor 860 outputs the first graphic object on the first display 810 (S910).

Figure 10:
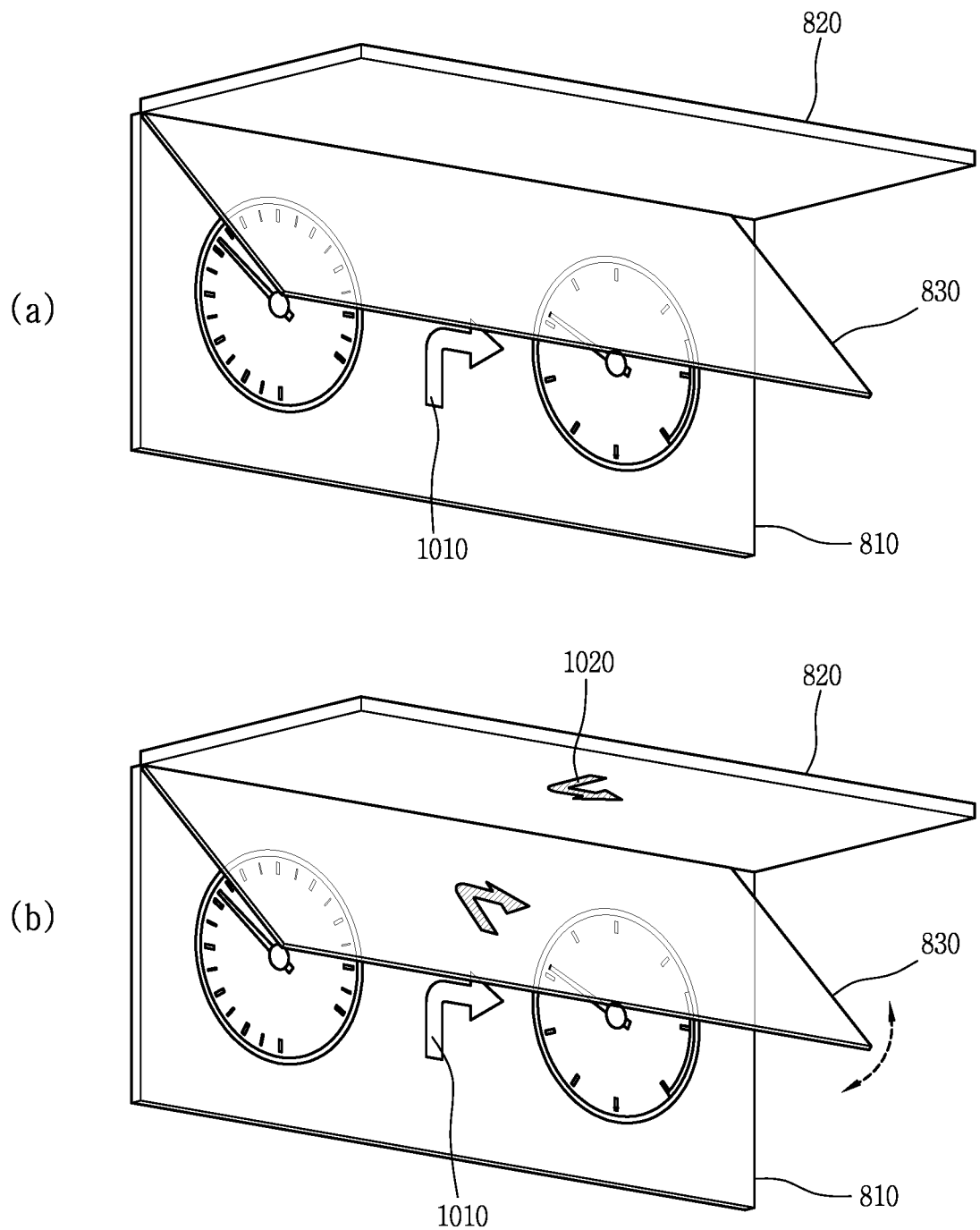
FIGS. 10 to 12 are exemplary views illustrating operations of the display device according to the control method of FIG. 9.

For example, as illustrated in FIG. 10, direction guidance information 1010 for guiding a route to a destination may be output on the first display 810 in a turn by turn (TBT) manner. The direction guidance information 1010 may be the first graphic object.

Figure 11:
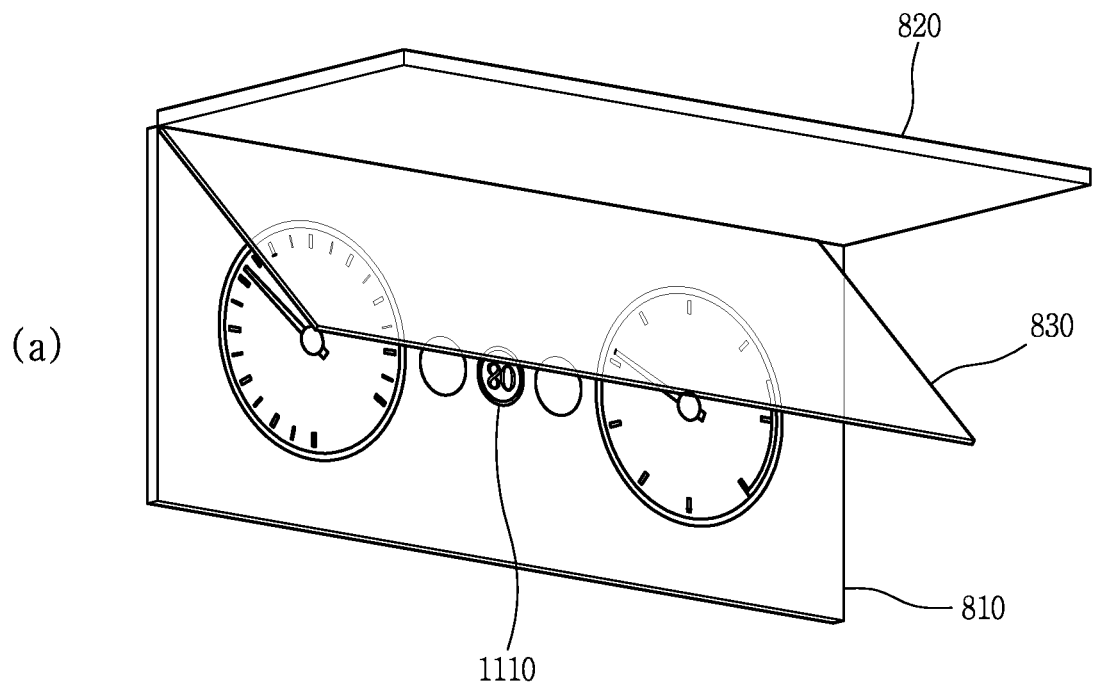
Figure 11:
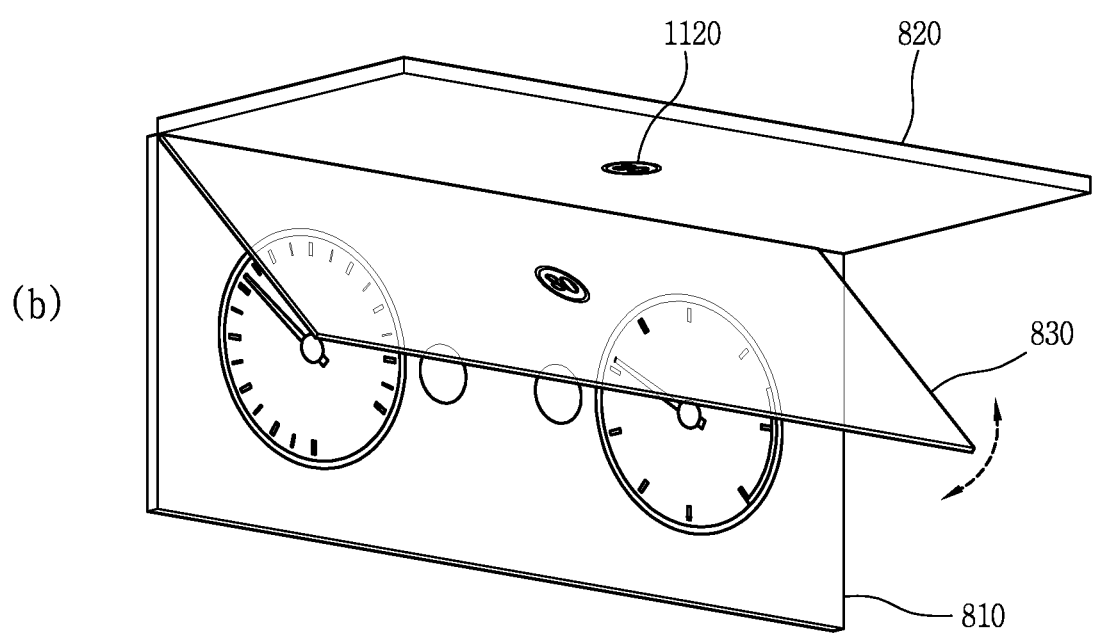
Figure 12:
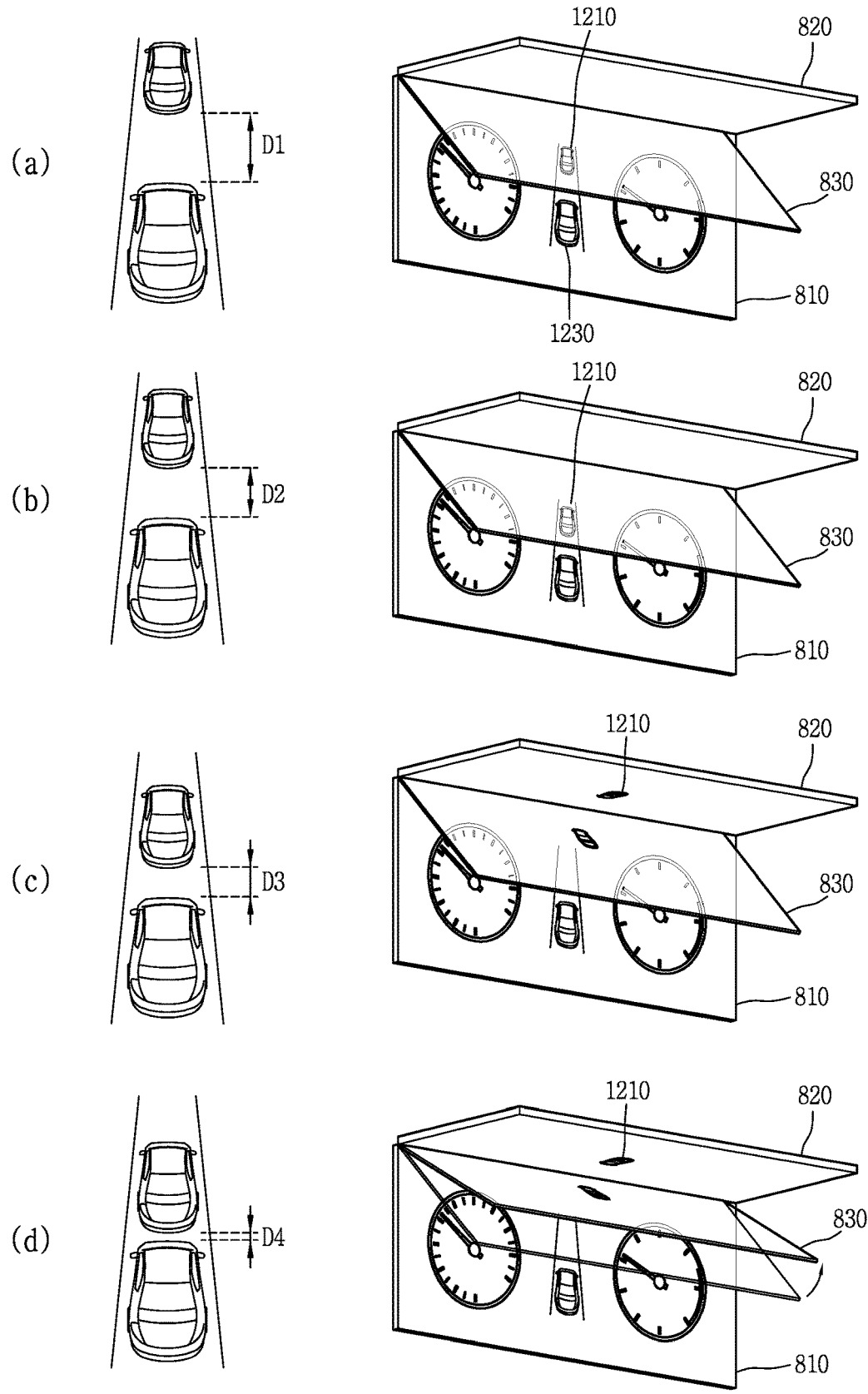

As another example, the first graphic object may be speed limit information 1110 for guiding the speed limit of a currently-traveling road as illustrated in FIG. 11, or object information 1210 for guiding an object with possibility of collision as illustrated in FIG. 12.

Next, the processor 860 displays the second graphic object on the second display 820 based on a traveling state (driving state or running state) of the vehicle 100 (S930).

The processor 860 controls the second display 820 such that the second graphic object corresponding to the first graphic object is output on the second display 820 when a preset condition is satisfied while the first graphic object is output on the first display 810.

The preset condition may be variously set, and the display device 800 may further include a memory (not illustrated) for storing such various preset conditions.

The processor 860 may determine whether at least one of the preset conditions is satisfied according to the running state of the vehicle 100, and determine a type of the second graphic object to be output and whether or not to display the second graphic object.

The processor 860 may determine the running state of the vehicle based on vehicle driving information received through the communication unit 850. That is, the second graphic object to be displayed on the second display 820 may be selected based on the vehicle driving information.

For example, as illustrated in FIG. 10, when a point at which the vehicle 100 should change a direction (or a point at which the driver should pay attention) is located within a first reference distance range, the first graphic object 1010 may be output on the first display 810. Thereafter, when the point is located within a second reference distance range due to the movement of the vehicle 100, a second graphic object 1020 corresponding to the first graphic object 1010 may be output on the second display 820. Since the second graphic object 1020 is output in a manner of overlapping the first graphic object 1010, the passenger confirms a short distance left up to the point.

As another example, as illustrated in FIG. 11, when the vehicle 100 enters a road on which a speed limit is set or enters a speed enforcement zone in which the speed limit is cracked down, the first graphic object 1110 may be output on the first display 810. Further, when a current speed of the vehicle 100 is faster than the speed limit, the second graphic object 1020 may be output on the second display 820 to guide or slow down the current speed.

When the second graphic object 1120 is output on the second display 820, the first graphic object 1110 output on the first display 810 may disappear from the first display 810, thereby producing an effect that the first graphic object 1110 pops out from the back to the front. Alternatively, an overlapping effect for emphasizing specific information may also be produced by simultaneously outputting the first and second graphic objects 1110 and 1120 on the first and second displays 810 and 820, respectively.

Next, the processor 860 may tilt the light synthesizing unit 830 based on the running state (or the vehicle driving information). In more detail, the processor 860 may control the driving unit 840 to vary the first angle.

As the light synthesizing unit 830 is tilted, a distance between one point of the light synthesizing unit 830 and the first display 810 is changed and accordingly a depth value of the second graphic object output on the second display 820 is changed. In other words, the processor 860 may adjust the depth value for the second graphic object by controlling the driving unit 840. The passenger can feel the effect that the second graphic object approaches or gets away from him/her as the first angle is changed.

For example, referring to FIG. 10, before the second graphic object 1020 is output, the light synthesizing unit 830 may be tilted such that the first angle is a minimum angle. The light synthesizing unit 830 may be tilted such that the first angle can be changed from the minimum angle to a maximum angle as the vehicle 100 moves (or the point to switch the direction of the vehicle is getting close) after the second graphic object is output. The second graphic object 1020 has a minimum depth value at a point where the reference angle is the minimum angle, and has a maximum depth value at a point where the reference angle is the maximum angle. As a result, the passenger can intuitively perceive that the point to switch the direction of the vehicle is gradually approaching. Afterwards, when the vehicle passes through the point, the second graphic object 1020 may disappear from the second display 820 and the light synthesizing unit 830 may be tilted such that the first angle has the initial setting value.

As another example, referring to FIG. 11, the light synthesizing unit 830 may be tilted such that the first angle has a predetermined angle, and the predetermined angle may depend on speed of the vehicle 100. The first angle may near the maximum angle as a current speed increases, and may near the minimum angle as the current speed slows down. Since the second graphic object 1120 has a larger depth value as the current speed is faster, the passenger can feel a sense of speed for the current speed in a stereoscopic manner.

As another example, referring to FIG. 12, when there is an external object having possibility of collision with the vehicle 100, the processor 860 may output object information guiding the external object on the first display 810 as a first graphic object 1210. In detail, when the possibility of collision is a first level or a distance from the external object is within a first reference distance range, the processor 860 controls the first display 810 to output the first graphic object.

At this time, a vehicle object 1230 indicating the vehicle 100 may be output together with the first graphic object 1210. The vehicle object 1230 and the first graphic object 1210 may be displayed spaced apart from each other in proportion to distances d1 to d4 between the vehicle 100 and the external object.

The processor 860 may control the second display 820 to output a second graphic object 1220 when the possibility of collision is a second level or the distance from the external object is within a second reference distance range. And, the processor 860 may control the driving unit 840 to change the first angle according to the distance from the external object or the possibility of collision with the external object.

When an object having possibility of collision is present, notification information informing the object may be provided by a first graphic object in a 2D manner or by a second graphic object in a 3D manner according to the possibility of collision. In addition, since the first angle of the light synthesizing unit varies according to the possibility of collision, the notification information can be more effectively transmitted to the passenger.

Although not illustrated in FIG. 12, when the possibility of collision is lower than a reference value, the processor 860 may control the first and second displays 810 and 820 such that the first and second graphic objects 1210 and 1220 disappear, and control the driving unit such that the first angle has the initial setting value.

As aforementioned, the first display 810 may output first light that forms first visual information, and the second display 820 may output second light that forms second visual information. Since the first light passes directly through the light synthesizing unit 830, the user recognizes that the first visual information is output on the first display 810. On the other hand, since the second light is reflected by the light synthesizing unit 830, the user may recognize that the second visual information is output on the light synthesizing unit 830. Due to a distance between the light synthesizing unit 830 and the first display 810, the second visual information is recognized as being output on the first visual information, and the first visual information and the second visual information may form three-dimensional (3D) depth.

Meanwhile, the display device 800 according to the present invention may be configured such that the first display 810 and/or the second display 820 are replaced. Specifically, an operation performed by the first terminal 810 and/or the second display 820 may be performed by a mobile terminal having a touch screen.

Hereinafter, description will be given of a display device 800 that provides various vehicle driving information in a two-dimensional (2D) or three-dimensional (3D) manner in cooperation with a mobile terminal 1300.

Examples of the mobile terminal 1300 disclosed herein may include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs), etc.), and the like.

The mobile terminal 1300 includes a touch screen 1310. The touch screen 1310 may have an inter-layered structure or an integrated structure of a display unit and a touch sensor.

Figure 13:
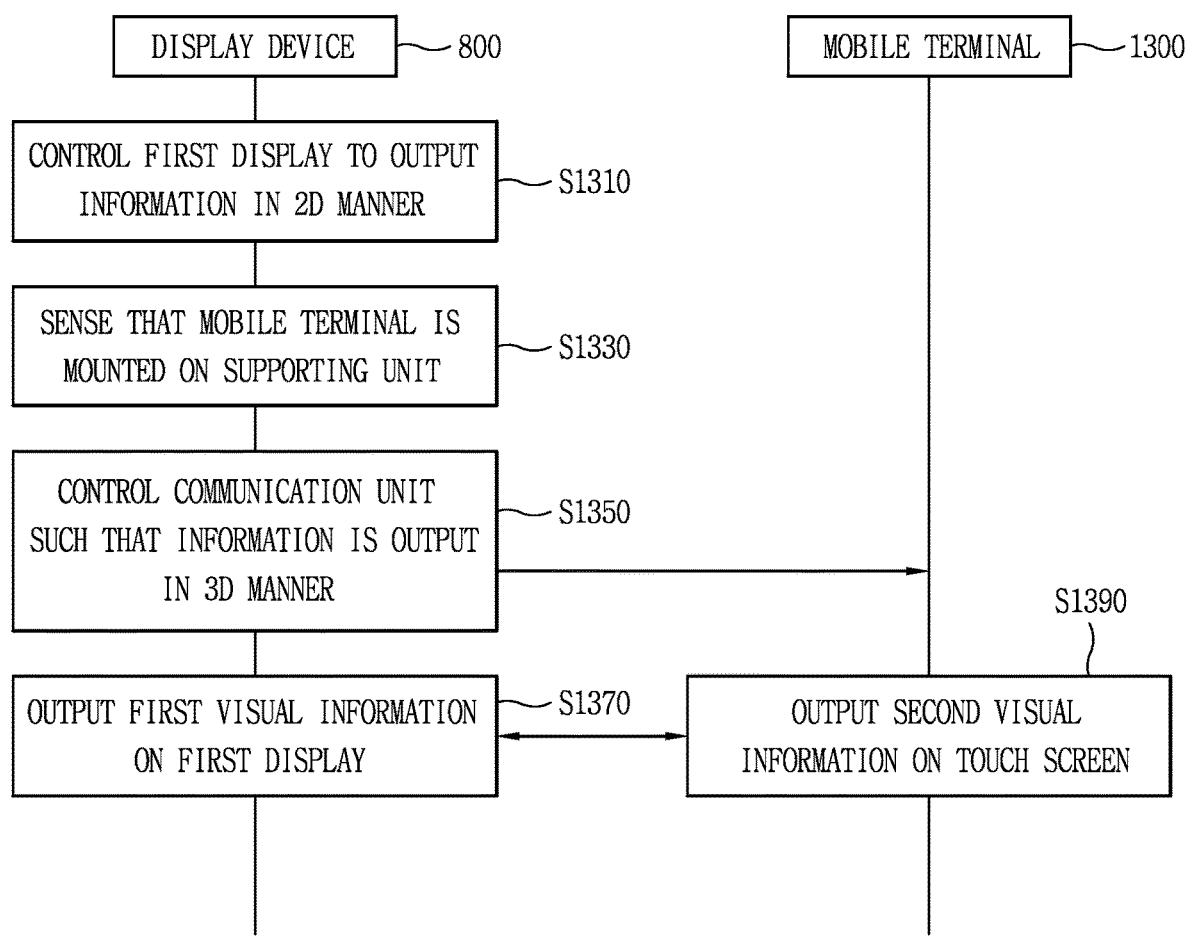
FIG. 13 is a flowchart illustrating a method in which a display device outputs information in a two-dimensional or three-dimensional manner in cooperation with a mobile terminal according to an embodiment of the present invention.
Figure 14A:
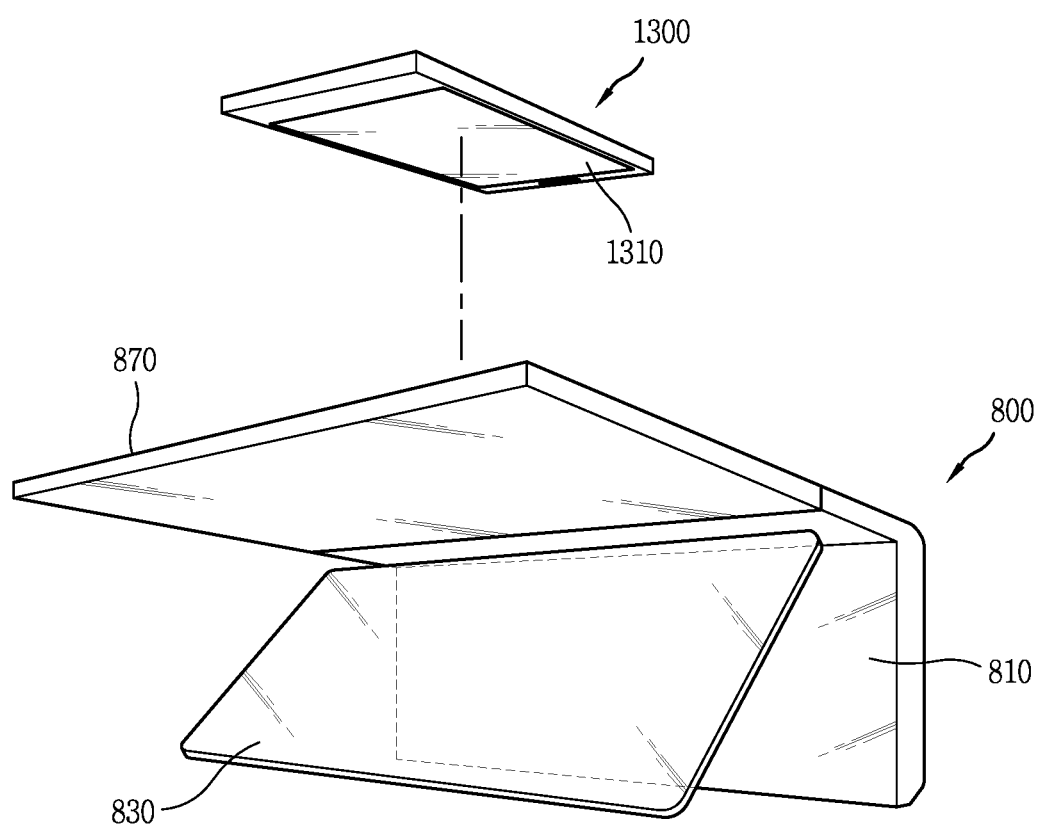
FIGS. 14A to 14C are exemplary views illustrating the method of FIG. 13.
Figure 14B:
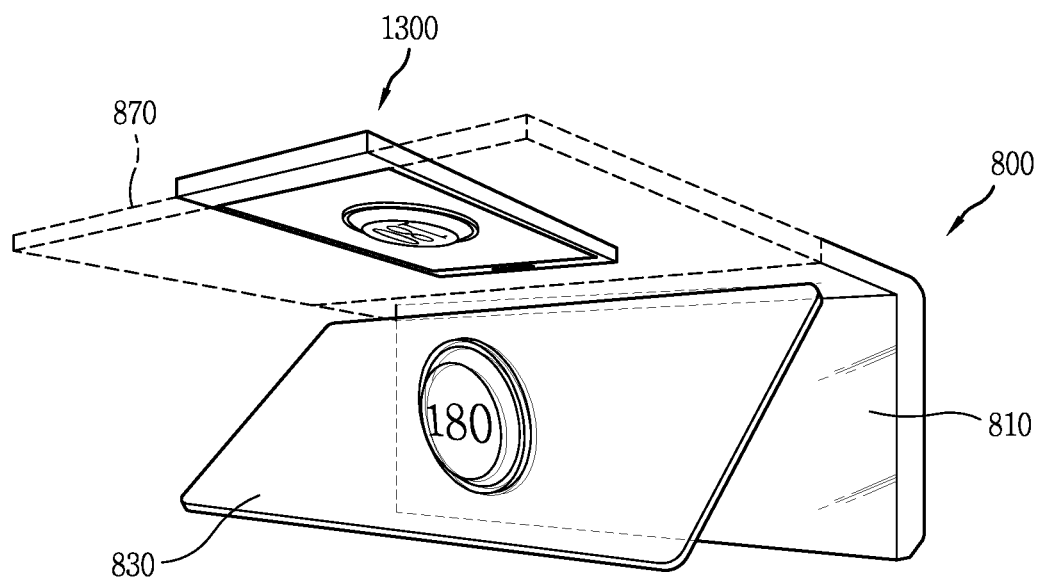
Figure 14C:
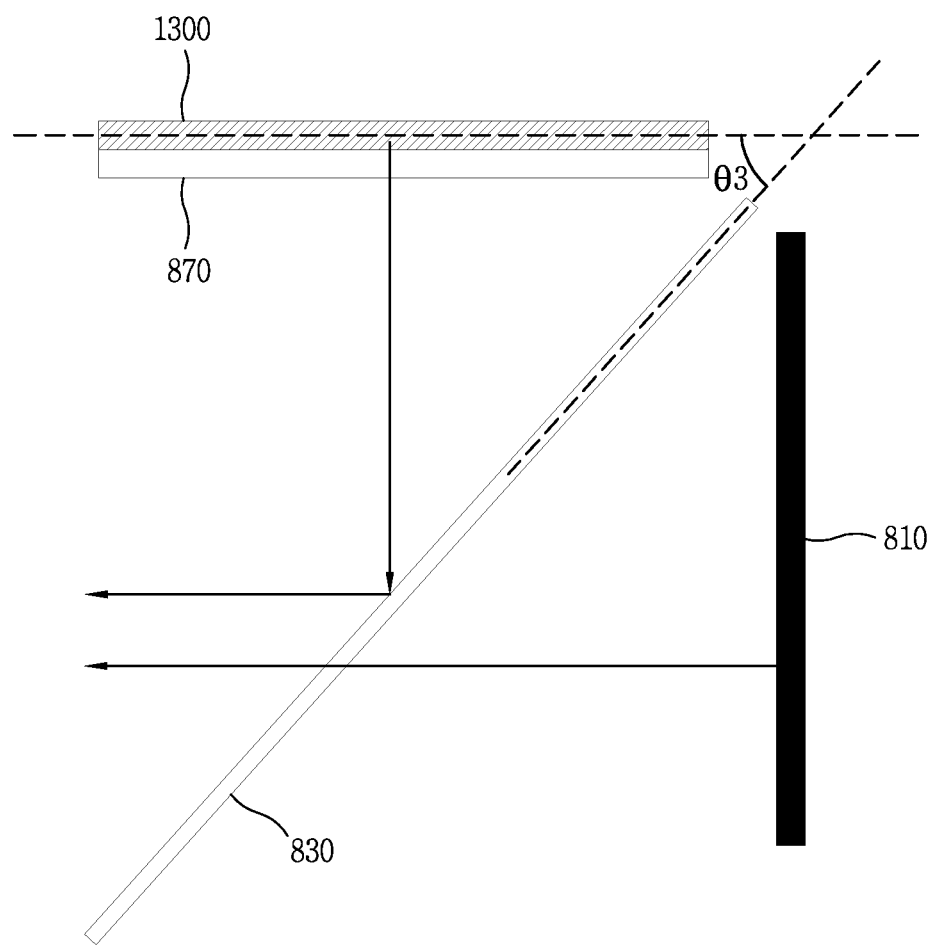

FIG. 13 is a flowchart illustrating a method in which a display device outputs information in a 2D or 3D manner in cooperation with a mobile terminal according to the present invention, and FIGS. 14A to 14C are exemplary views illustrating the method of FIG. 13.

Referring to FIG. 13, the display device 800 or the processor 860 controls the first display 810 to output information in a 2D manner (S1310). Hereinafter, for the sake of explanation, the present invention will briefly describe the operations of the display device 800, but the operations of the display device 800 may be performed by the processor 860.

When an output is performed in a 2D manner, the first display 810 outputs the first visual information.

Since the first visual information output on the first display 810 is the only information transferred to the user through the light synthesizing unit 830, the display device 800 provides the first visual information in the 2D manner.

Here, the 2D manner refers to "a method in which information output on the display device 800 is recognized by the user as being located on one surface." The surface may be flat or spherical.

The first visual information may include general information, for example, speed and a fuel level of the vehicle 100, which are to be displayed on a dashboard, and may also include the vehicle driving information.

Meanwhile, the display device 800 according to one embodiment of the present invention may further include a supporting unit 870.

FIGS. 14A to 14C illustrate an example in which the second display 820 is replaced with the touch screen 1310 of the mobile terminal 1300, but this is only an example. According to another embodiment, the first display 810 may alternatively be replaced with the touch screen 1310 of the mobile terminal 1300. Hereinafter, for convenience of explanation, a case where the second display 820 is replaced with the touch screen 1310 will be exemplarily described.

The first display 810 may output first light that forms first visual information, and the second display 820 may output second light that forms second visual information. When the second display 820 is replaced with the touch screen 1310 of the mobile terminal 1300, the touch screen 1310 outputs the second light forming the second visual information.

Referring to FIG. 14A, a display device 800 according to one embodiment of the present invention includes a first display 810, a light synthesizing unit 830, and a supporting unit 870. Since the first display 810 and the light synthesizing unit 830 have been described with reference to FIGS. 8A and 8B, the description thereof will be omitted.

The supporting unit 870 is configured to support a mobile terminal 1300 having a touch screen 1310. In detail, the supporting unit 870 is spaced apart from the first display 810 with the light synthesizing unit 830 interposed therebetween, to support the mobile terminal 1300 such that the second light output from the touch screen 1310 can be directed to the light synthesizing unit 830.

As illustrated in FIG. 14B, when the mobile terminal 1300 is mounted on the supporting unit 870, the touch screen 1310 may face the light synthesizing unit 830.

The light synthesizing unit 830 is configured to transmit one of the first light output from the first display 810 and the second light output from the touch screen 1310 therethrough, and reflect another one.

As illustrated in FIG. 14C, the supporting unit 870 supports a front surface of the mobile terminal 1300 such that the touch screen 1310 forms an acute angle θ3 with the light synthesizing unit 830. When the mobile terminal 1300 is mounted on the supporting unit 870, a first straight line passing through a center point of the touch screen 1310 and a second straight line passing through a center point of the light synthesizing unit 830 form an acute angle therebetween.

At least part of the supporting unit 870 brought into contact with the touch screen 1310 may support the mobile terminal 1300 and simultaneously be made transparent such that the second light output from the touch screen 1310 can be directed to the light synthesizing unit 830.

The supporting unit 870 may be configured as a transparent panel that supports the mobile terminal 1300 with respect to a gravitational direction.

The supporting unit 870 supports the mobile terminal 1300 so that the mobile terminal 1300 is prevented from being lowered by gravity. When the mobile terminal 1300 is mounted on the supporting unit 870, the second light output from the touch screen 1310 is directed to the light synthesizing unit 830 and then reflected by the light synthesizing unit 830 so as to be directed to the same path as the first light output from the first display 810. Here, the same path refers to that the first light and the second light proceed in parallel to each other.

Meanwhile, the second display 820 may be detachably coupled to the supporting unit 870, so as to be replaceable. The user can replace the second display 820 with the touch screen 1310, by detaching the second display 820 from the supporting unit 870 and placing the mobile terminal 1300 on the supporting unit 870.

Although not illustrated, the display device 800 may further include a power supply unit (not illustrated) for supplying power to the mobile terminal 1300 when the mobile terminal 1300 is mounted on the supporting unit 870.

The power supply unit may connect a battery provided in the vehicle 100 and the mobile terminal 1300 to each other by wire or wirelessly.

For example, the supporting unit 870 may be provided with a connection terminal for electrically connecting the battery of the vehicle 100 and the mobile terminal 1300 to each other. Power may be supplied to the mobile terminal 1300 by connection of the connection terminal.

Referring back to FIG. 13, the processor 860 may sense that the mobile terminal 1300 is mounted on the supporting unit 870 (S1330).

The processor 860 may sense that the mobile terminal 1300 is mounted on the supporting unit 870 based on information received from at least one processor provided in the vehicle 100, for example, the sensing unit 120.

The display device 800 may further include a sensor (not illustrated) configured to sense that the mobile terminal 1300 is mounted on the supporting unit 870.

For example, the sensor may be a camera configured to capture the supporting unit 870. The sensor or the processor 860 may determine whether the mobile terminal 1300 has been mounted based on an image captured through the camera.

As another example, the processor 860 may sense that an object is mounted on the supporting unit 870 by using a weight sensor for measuring a weight, and determine whether or not the object corresponds to the mobile terminal 1300 by attempting communication with the object through the communication unit 850.

In another example, the sensor may sense a capacitance that is changed by an object mounted on the supporting unit 870, determine whether or not the object can perform communication based on the sensed capacitance, and then determine whether the object corresponds to the mobile terminal 1300 by performing communication with the determined object.

As another example, the display device 800 may alternatively be provided with a detecting element for detecting that the mobile terminal 1300 is mounted on the supporting unit in an inserting manner.

In addition, various types of sensors may be used to sense that the mobile terminal 1300 is mounted on the supporting unit 870.

When the mobile terminal 1300 is mounted on the supporting unit 870, the processor 860 controls the communication unit 850 to output information in a 3D manner (S1350).

The processor 860 controls the first display 810 to output thereon first visual information which varies according to the vehicle driving information (S1370).

The processor 860 controls the communication unit 850 so that second visual information varying according to the vehicle driving information is output on the touch screen 1310. As a result, the mobile terminal 13100 outputs the second visual information on the touch screen 1310 (S1390).

When the mobile terminal 1300 is mounted on the supporting unit 870, the processor 860 establishes a connection with the mobile terminal 1300. The processor 860 may obtain characteristics of the touch screen 1310, such as resolution and size of the touch screen 1310, based on terminal information received from the mobile terminal 1300.

The processor 860 may generate an optimal screen to be displayed on the touch screen 1310 based on the characteristics of the touch screen 1310. Alternatively, the processor 860 may edit screens stored in the memory or a cloud, or select one of a plurality of screens stored.

When a screen to be displayed on the touch screen 1310 is decided, the processor 860 controls the communication unit 850 so that the decided screen is displayed as the second visual information on the touch screen 1310 of the mobile terminal 1300.

In detail, data corresponding to the second visual information may be transmitted from the display device 800 to the mobile terminal 1300. The communication unit 850 transmits a message to the mobile terminal 1300 so that the second visual information is output on the touch screen 1310 when the mobile terminal 1300 is mounted on the supporting unit 870.

The message transmitted to the mobile terminal 1300 by the communication unit 870 may include vehicle driving information generated by at least one processor included in the vehicle 100.

The display device 800 outputs the first visual information on the first display (S1370)

The mobile terminal 1300 turns on the touch screen 1310 which has been turned off, in response to the message, and outputs the second visual information on the touch screen 1310 (S1370).

In a basic state in which the mobile terminal 1300 is not mounted on the supporting unit 870, visual information passing through the light synthesizing unit 830 is only the first visual information generated from the first display 810, and thus various kinds of information are output in a 2D manner.

On the other hand, when the mobile terminal 1300 is mounted on the supporting unit 870, the first visual information and the second visual information generated in the display device 800 and the mobile terminal 1300 pass through the light synthesizing unit 830, and thus various kinds of information are output in a 3D manner.

Although not illustrated, an event may occur while the first visual information is output on the first display 810 and the second visual information is output on the touch screen 1310.

In this case, the processor 860 controls the first display 810 to output thereon third visual information corresponding to the event, and controls the communication unit 850 such that fourth visual information corresponding to the event is output on the touch screen 1310. That is, as the first visual information output on the first display 810 is changed, the second visual information output on the touch screen 1310 is changed.

The use of the mobile terminal of the driver during driving is prohibited. However, since the display device 800 according to the present invention can provide various kinds information in a 3D manner using a mobile terminal whose use is prohibited, the use of the mobile terminal during traveling can be inhibited and a new user interface can be provided.

Figure 15:
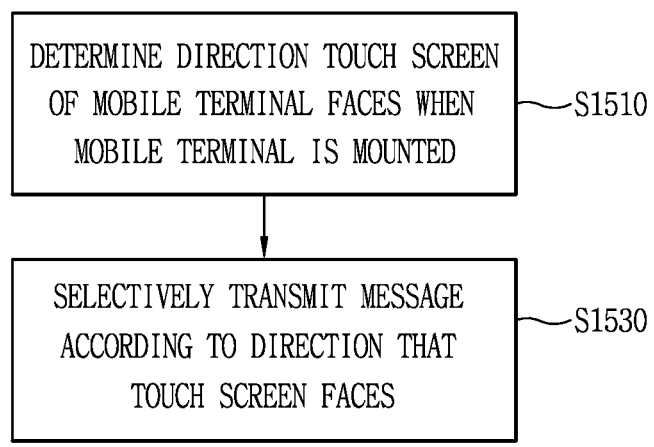
FIG. 15 is a flowchart illustrating a control method of a display device for selecting an output manner according to a direction that a mobile terminal is placed.

FIG. 15 is a flowchart illustrating a control method of a display device for selecting an output method according to a direction in which a mobile terminal is mounted.

The mobile terminal 1300 may be mounted on the supporting unit 870 in various manners. For example, the mobile terminal 1300 may be mounted in a first direction that the touch screen 1310 faces the light synthesizing unit 830 or in a second direction that is an opposite direction to the first direction.

When the mobile terminal 1300 is mounted in the first direction, information may be provided in a 3D manner. On the other hand, when various types of information are displayed on the touch screen 1310 in a state where the mobile terminal 1300 is mounted in the second direction, the mobile terminal 1300 merely interferes with the driver's travel.

In order to solve this problem, the display device 800 determines a direction that the touch screen 1310 of the mobile terminal 1300 faces when the mobile terminal 1300 is mounted on the supporting unit 870 (S1510).

The processor 860 may determine the direction that the touch screen 1310 faces, on the basis of information received from the sensing unit 120 provided in the vehicle 100 or information received from a sensor provided in the display device 800.

Next, the processor 860 may selectively transmit a message for outputting the second visual information on the touch screen 1310 according to the direction that the touch screen 1310 faces (S1530).

For example, the message may be transmitted to the mobile terminal 1300 when the touch screen 1310 faces the first direction, whereas the message may not be transmitted to the mobile terminal 1300 when the touch screen 1310 faces the second direction.

As another example, the message may be transmitted to the mobile terminal 1300 when the touch screen 1310 faces the first direction. However, a control command for requesting the mobile terminal to execute a driving (travel) mode may be transmitted to the mobile terminal 1300 when the touch screen faces the second direction.

Here, the driving mode refers to a state in which the touch screen 1300 is restricted from being turned on even when various events occur in the mobile terminal 1300. For example, even when a text message is received, the touch screen 1300 is not turned on and remains off in the driving mode. That is, if the driving mode is being executed, outputting notifications in audible, tactile and visual manners, in response to occurrence of various events, are restricted.

Event information related to an event occurring while the driving mode is executed may be displayed on the touch screen 1310 after the driving mode is released or may be transmitted to the display device 1300 in real time to be displayed on the first display 810.

Meanwhile, since the mobile terminal 1300 does not have a standardized size, it can have various sizes and shapes. Similarly, the touch screen 1310 for outputting the second visual information may also have various sizes. The display device 800 according to the present invention provides an optimal user interface, considering the characteristics of the mobile terminal 1300 mounted on the supporting unit 870.

Figure 16:
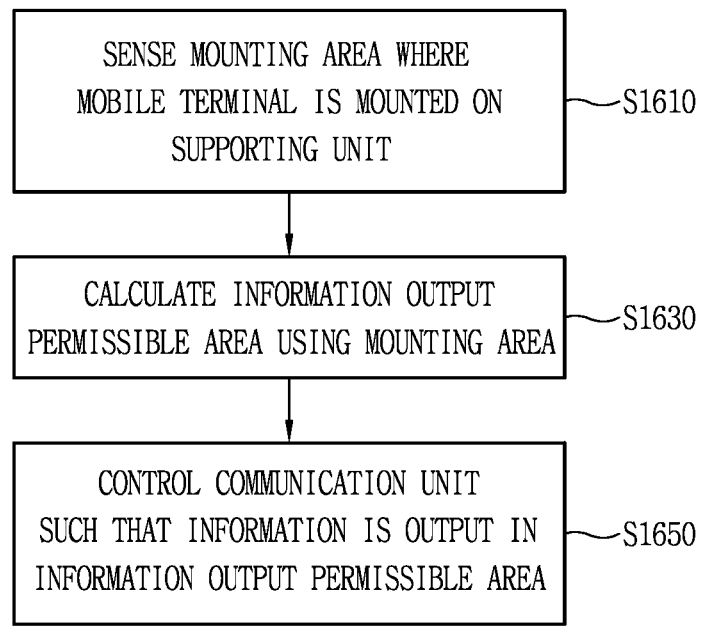
FIG. 16 is a flowchart illustrating a control method of a display device for outputting various types of information in a three-dimensional manner in consideration of a mounting area of a mobile terminal.

FIG. 16 is a flowchart illustrating a control method of a display device for outputting various information in a 3D manner in consideration of a mounting area of a mobile terminal, and FIGS. 17A to 17D are exemplary views illustrating the control method of FIG. 16.

Referring to FIG. 16, the display device 800 senses a mounting area where the mobile terminal 1300 is mounted on the supporting unit 870 (S1610).

To this end, the display device 800 may further include a sensor configured to sense a mounting area where the mobile terminal 1300 is mounted on the supporting unit 870. For example, the sensor may be a camera that captures the supporting unit 870, and the mounting area may be calculated from an image captured by the camera.

Size and shape of the mounting area correspond to size and shape of the touch screen 1310. In other words, the mounting area may have the same size and shape as the touch screen 1310, or may have a shape with the same ratio even though a size is different.

A coordinate system indicating an entire area of the supporting unit 870 is preset and the processor 860 may calculate a coordinate section for the mounting area based on information received from the sensor.

Next, the display device 800 calculates an information output permissible area using the mounting area (S1630). More specifically, the display device 800 searches for an area, which overlaps the mounting area, of a 3D information display area, and sets the searched area as the information output permissible area.

Here, the mounting area is defined as an area, on which the mobile terminal 1300 is mounted, of the entire area of the supporting unit 870. The mounting area varies depending on a type of the mobile terminal 1300, a placed direction of the mobile terminal 1300, and a direction that one end of the mobile terminal 1300 faces.

The 3D information display area refers to a preset area in which information output in a 3D manner is permitted. At least one area of the supporting unit 870 may be set as the 3D information display area.

For example, when the entire area of the supporting unit 870 is set as the 3D information display area, the mounting area is set directly as the information output permissible area.

On the other hand, when a partial area of the supporting unit 870 is set as the 3D information display area, an output of 3D information is permitted only within the partial area, and prohibited within the remaining area.

The dashboard outputs essential information, such as a fuel level and a current speed, which must be displayed. When 3D information is output together with the essential information in an overlapping manner, the driver's perception of the essential information may be deteriorated. That is, since the information output in the 3D manner may interfere with the driver's driving, the 3D information display area may be set within a range without causing interference.

The 3D information display area may vary depending on a screen which is currently displayed on the first display 810.

Figure 17A:
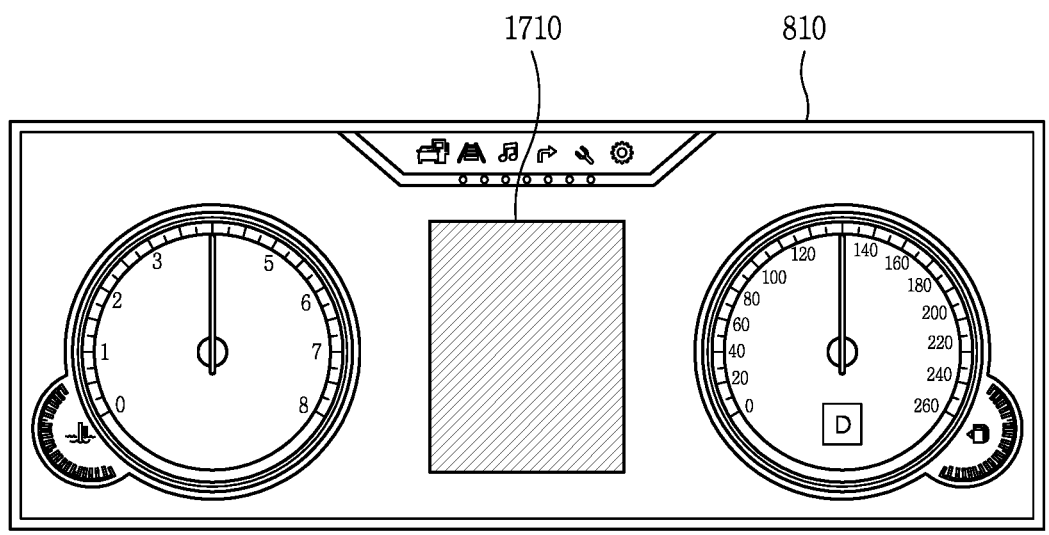
FIGS. 17A and 17D are exemplary views illustrating the control method of FIG. 16.
Figure 17A:
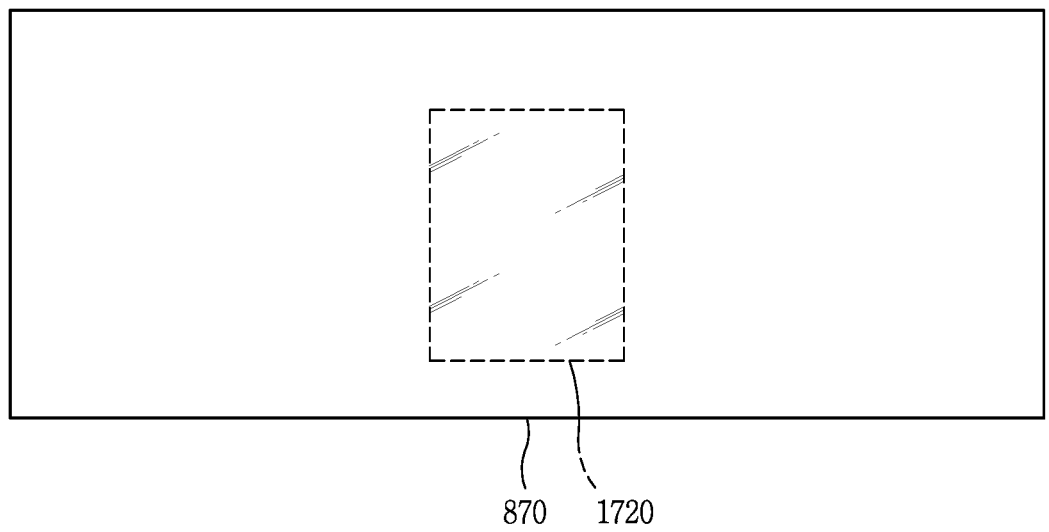

Referring to FIG. 17A, when a first area 1710 for outputting 3D information is set on the first display 810, a second area 1720 may also be set on the supporting unit 870 accordingly. In this case, the second area 1720 is defined as the 3D information display area.

Since the second visual information is displayed only in the second area 1720, an area where information is provided in a 3D manner by overlapping the second visual information on the first display 810 is limited to the first area 1710. In other words, the remaining area except for the first area 1710 provides information only in a 2D manner.

Meanwhile, the information output permissible area is defined as an overlapped area between the 3D information display area and the mounting area, and refers to an area, in which an output of information is permitted, of the touch screen 1310.

Figure 17B:
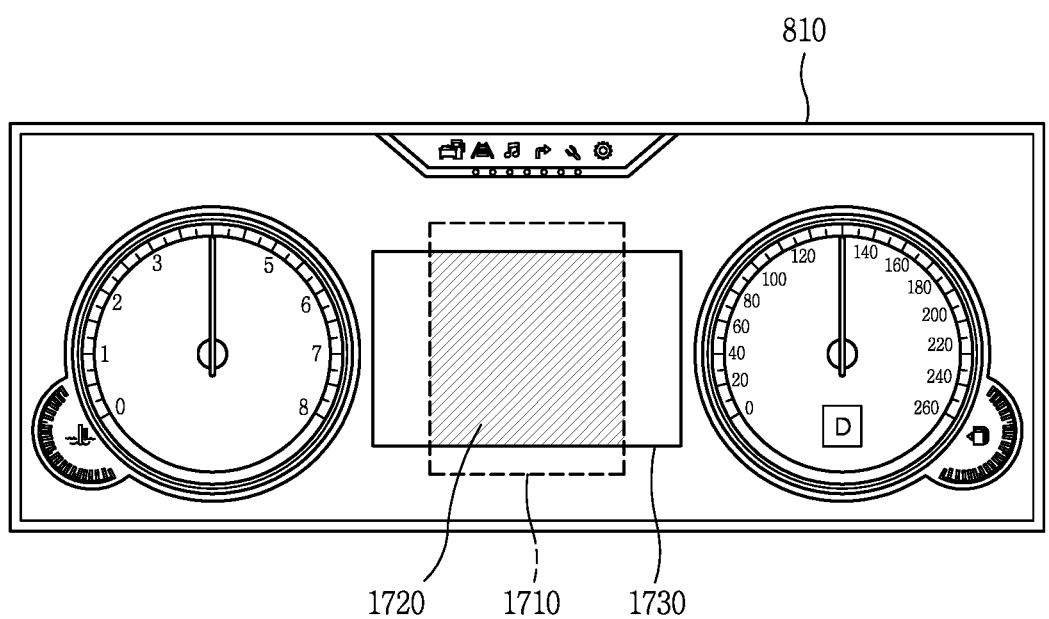
Figure 17B:
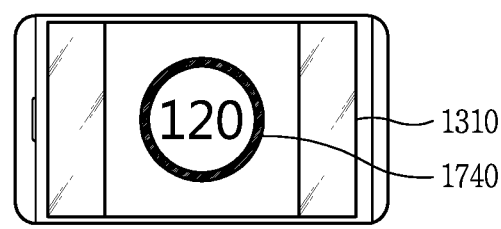

As illustrated in FIG. 17B, the 3D information display area 1710 of the entire area of the supporting unit 870 is preset, and the mounting area 1730 is sensed based on information received from the sensor. Then, an overlapped area between the mounting area 1730 and the 3D information display area 1710 is calculated as the information output permissible area 1720.

An area, in which an output of the second visual information is permitted, of the entire area of the touch screen 1310, is limited to the information output permissible area 1720. The information output permissive area 1720, in which the second visual information is to be output, of the entire area of the touch screen 1310 is calculated differently depending on the 3D information display area 1710 and/or the mounting area 1730.

After the information output permissible area 1720 is calculated, the display device 800 controls the communication unit 850 such that information is output in the information output permissible area 1720 (S1650).

The communication unit 850 transmits information corresponding to the information output permissible area 1720 to the mobile terminal 1300 so that the second visual information is output in the information output permissible area 1720.

The mobile terminal 1300 then outputs the second visual information only in the information output permissible area 1720.

For example, the mobile terminal 1300 may turn on the information output permissible area 1720 of the touch screen 1310 and turn off the remaining area. That is, the mobile terminal 1300 may turn on only a partial area, which corresponds to the information output permissible area, of the entire area of the touch screen 1310.

In another example, the mobile terminal 1300 may output the second visual information in the information output permissible area 1720 of the touch screen 1310 and output a black image in the remaining area. Accordingly, an effect of outputting information only in the information output permissible area 1720 can be produced.

Figure 17C:
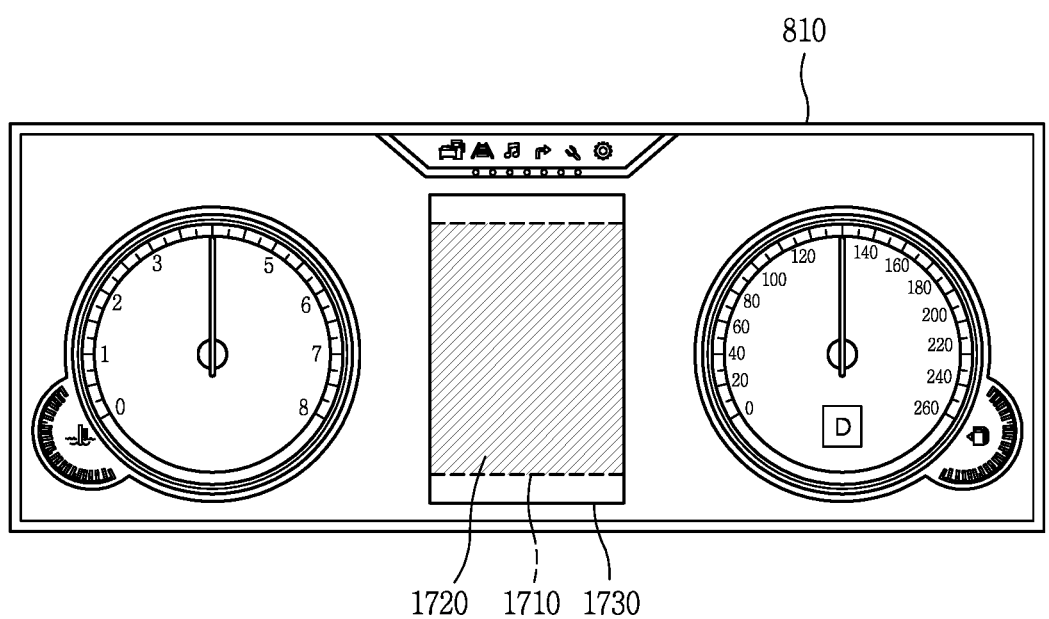
Figure 17C:
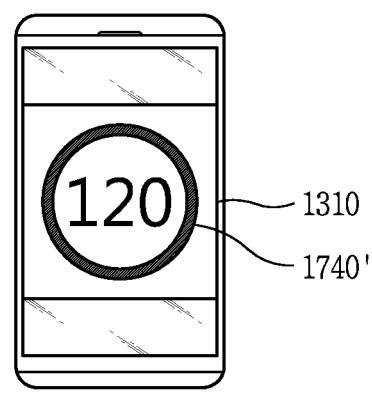
Figure 17D:
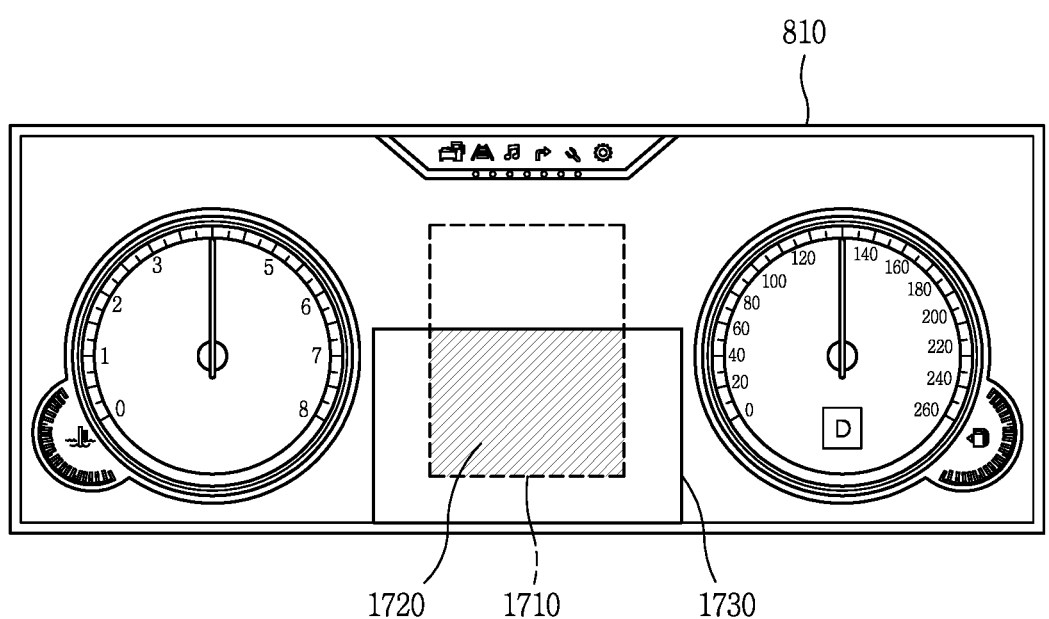
Figure 17D:
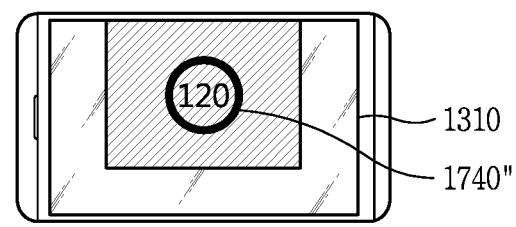

FIGS. 17B to 17D illustrate embodiments in which the information output permissible area 1720 is changed in response to the mounting area 1730 being changed in a state that the 3D information display area 1710 is fixed.

The display device 800 may transmit a different message to the mobile terminal 1300 so that at least one of an output position and an output size of the second visual information on the touch screen 1310 can be changed according to the mounting area 1730.

For example, when a current speed of the vehicle 100 is close to a maximum speed limit set on a currently-traveling road, a graphic object 1740 that guides the maximum speed limit may be displayed on the touch screen 1310 as the second visual information. At this time, at least one of an output position and an output size of the graphic object may be changed according to the mounting area 1730, as illustrated in FIGS. 17B to 17D.

In other words, size and position of even the same information may vary according to the mounting area 1730.

Meanwhile, when a specific event occurs or a specific function is executed, an execution screen corresponding to the specific event or function may be output on the touch screen 1310 as the second visual information. Hereinafter, a method of outputting a different execution screen even when the same event occurs will be described with reference to FIGS. 18 to 20.

Figure 18:
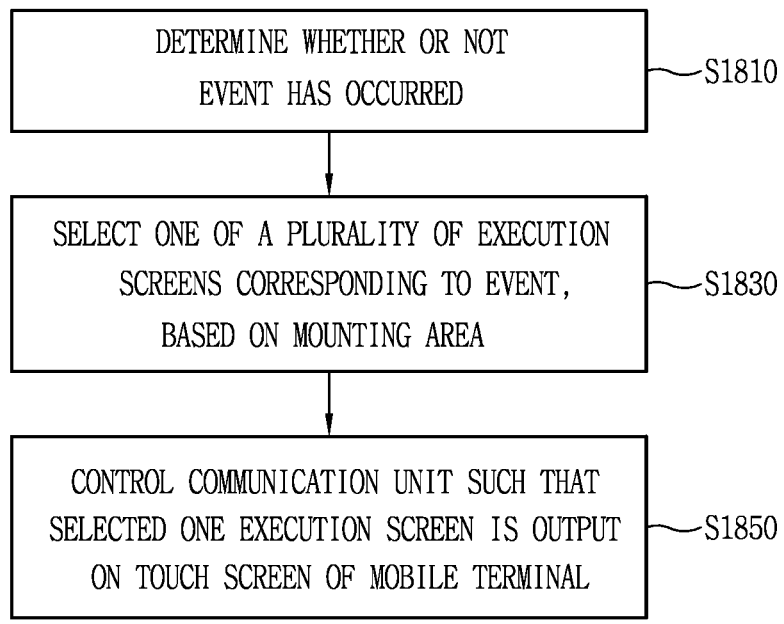
FIG. 18 is a flowchart illustrating a method of displaying a different execution screen even when the same event occurs.
Figure 19:
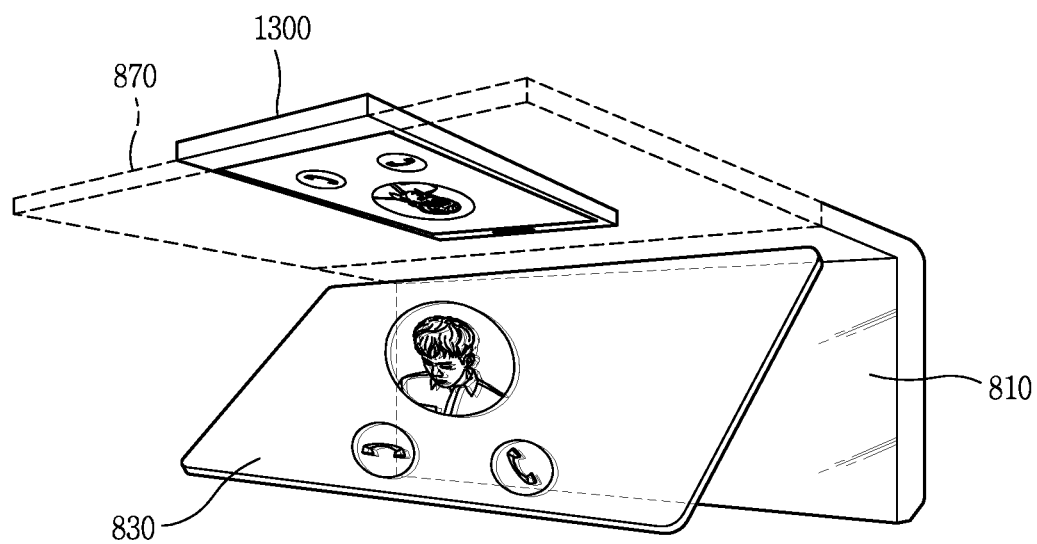
FIGS. 19 and 20 are exemplary views illustrating the control method of FIG. 18.
Figure 19:
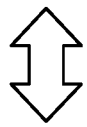
Figure 19:
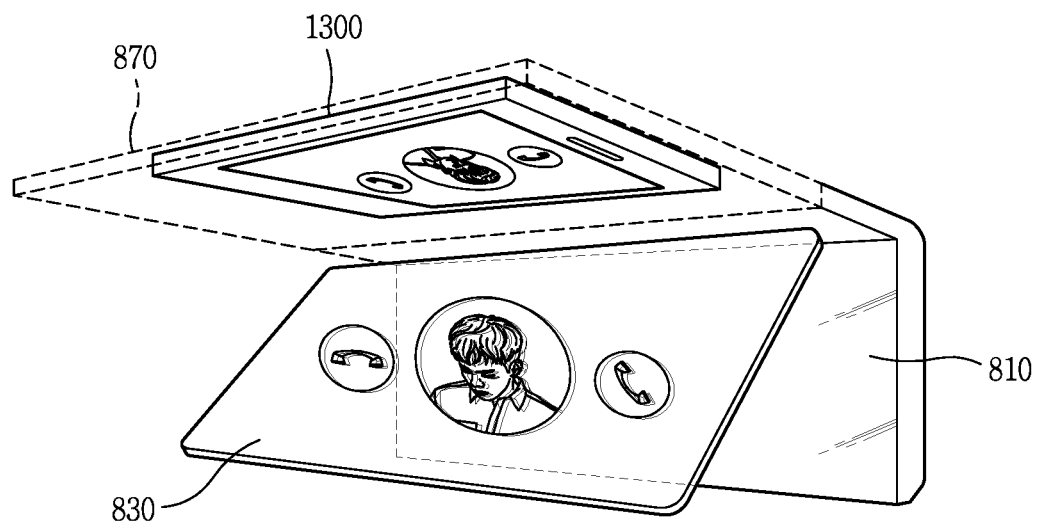
Figure 20:
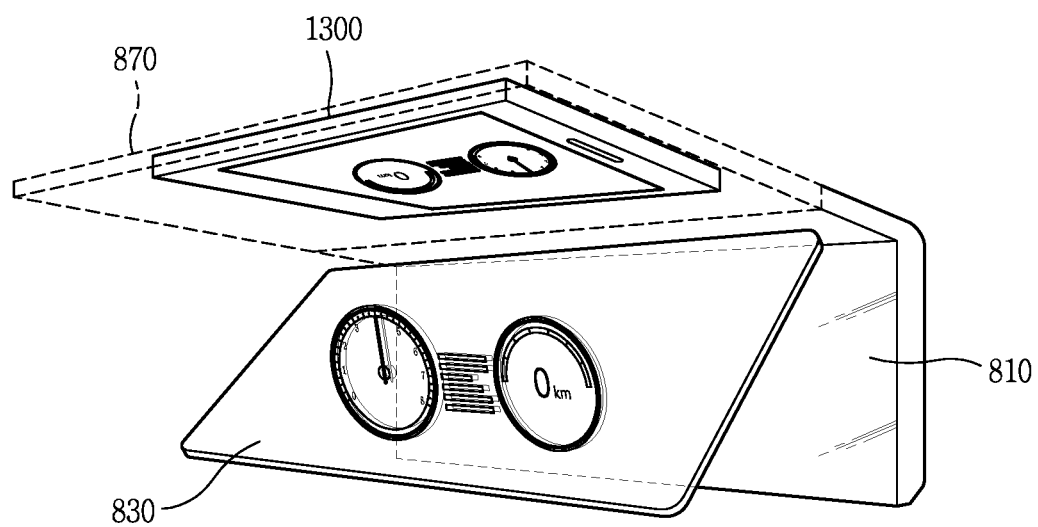
Figure 20:
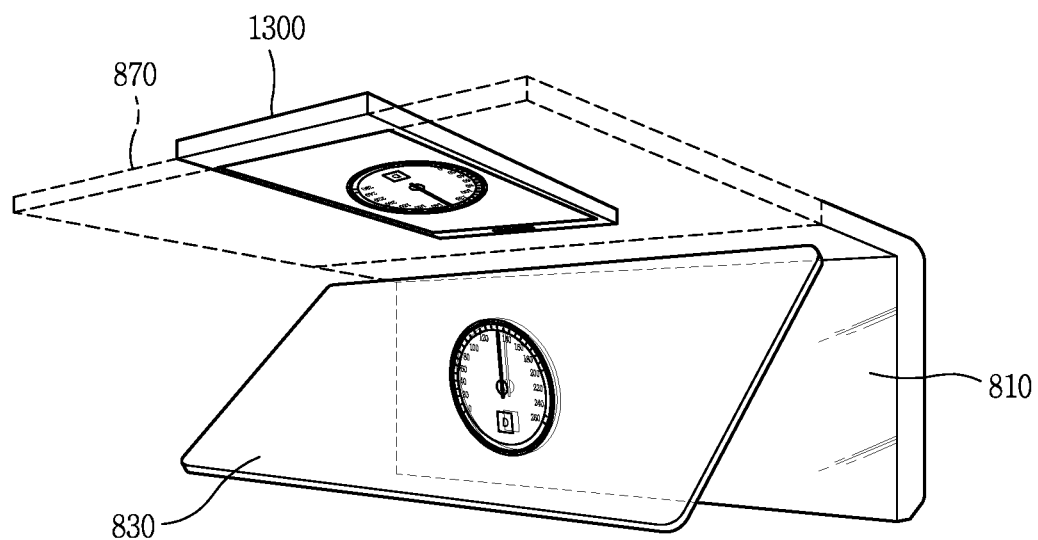

FIG. 18 is a flowchart illustrating a method of outputting a different execution screen even when the same event occurs, and FIGS. 19 and 20 are exemplary views illustrating the control method of FIG. 18.

First, the display device 800 determines whether an event has occurred (S1810).

The display device 800 may detect an occurrence of an event in an electric component and/or an application provided in the vehicle 100, or an occurrence of an event in the mobile terminal 1300 by using information received through the communication unit 850.

The application is a concept including a widget, a home launcher, and the like, and refers to all types of programs that can be run on the mobile terminal 1300. Accordingly, the application may be a program that performs a function of a web browser, a video playback, a message transmission/reception, a schedule management, or an application update.

When the event occurs, an execution screen corresponding to the event should be displayed in at least one area of the touch screen 1310. More specifically, the execution screen is displayed in the information display permissible area 1720 of the entire area of the touch screen 1310.

On the other hand, a plurality of execution screens corresponding to the same event may be preset, and the display device 800 may select one of the plurality of execution screens corresponding to the event based on the mounting area 1730 (S1830).

The size and shape of the mounting area 1730 may vary depending on how the user mounts the mobile terminal 1300 on the supporting unit 870. If only one execution screen is preset, there arises a problem that it cannot be matched with the mounting area 1730 having various sizes and shapes.

Accordingly, the memory of the display device 800 or the memory of the mobile terminal 1300 may store a plurality of execution screens corresponding to a predetermined event.

The display device 800 selects one of the plurality of execution screens based on the mounting area 1730.

For example, one of the execution screens may be selected according to a size, a ratio, and a shape of the mounting area 1730, or according to a direction that one end of the touch screen 1310 faces.

As illustrated in FIG. 19, when a call is received in the mobile terminal 1300, one execution screen may be output as the second visual information, in response to an event of the call reception. At this time, the display device 800 or the mobile terminal 1300 may select a different execution screen according to which direction an upper end of the mobile terminal 1300 faces. In other words, the second visual information output on the touch screen 1310 may vary according to the direction that one end of the mobile terminal 1300 mounted on the supporting unit 870 faces.

For example, when the upper end of the mobile terminal 1300 and an upper end of the first display 810 are parallel to each other, a first execution screen corresponding to a portrait mode may be output. On the other hand, when the upper end of the mobile terminal 1300 and the upper end of the first display 810 are not parallel to each other, a second execution screen corresponding to a landscape mode may be output.

As illustrated in FIG. 20, when an event such as an output of a dashboard occurs, a different execution screen may be output on the touch screen 1310 according to the direction that the upper end of the mobile terminal 1300 faces, that is, according to the mounting area 1730.

The display device 800 controls the communication unit 850 such that the selected one execution screen is displayed on the touch screen 1310 (S1850).

In other words, the communication unit 850 may transmit a different message to the mobile terminal 1300 so that the second visual information output on the touch screen 1310 is changed according to the mounting area 1730.

According to the present invention, an optimal user interface is provided according to the mounting area 1730 of the mobile terminal 1300 mounted on the supporting unit 870. The user can be provided with an optimal user interface according to a situation simply by mounting his or her terminal on the supporting unit 870 even without changing settings separately.

Figure 21:
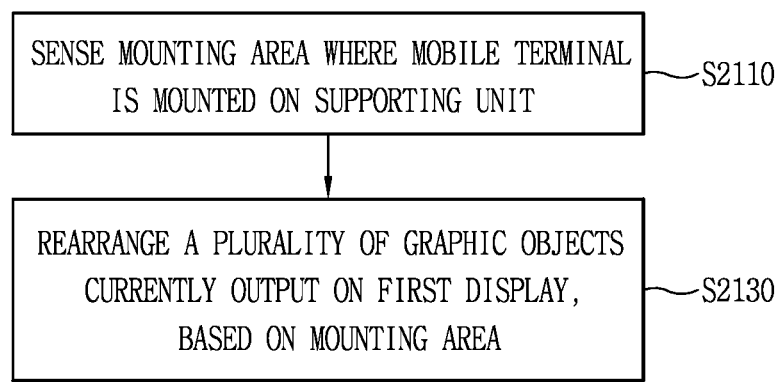
FIG. 21 is a flowchart illustrating a method of editing first visual information output on a first display based on a mounting area.
Figure 22A:
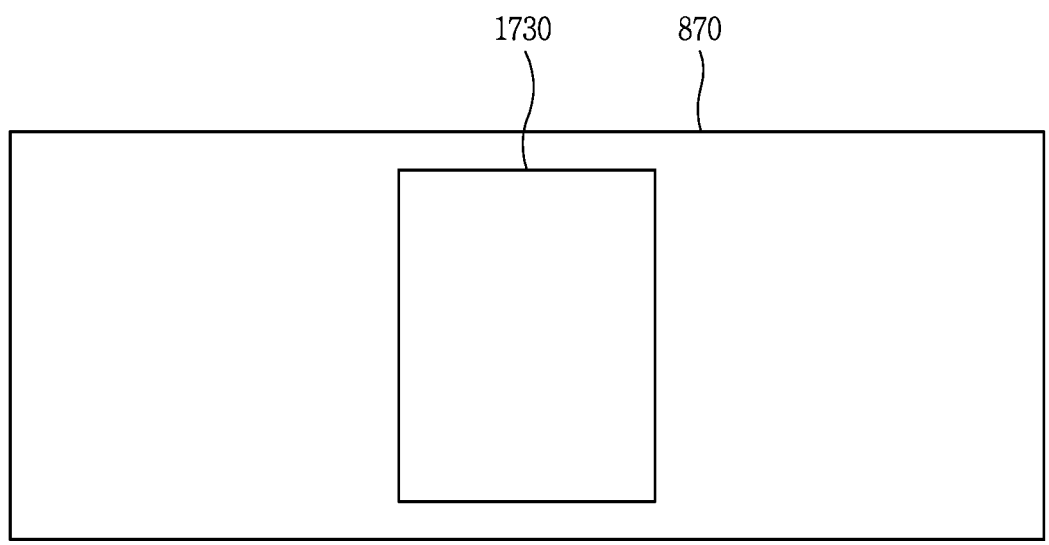
Figure 22A:
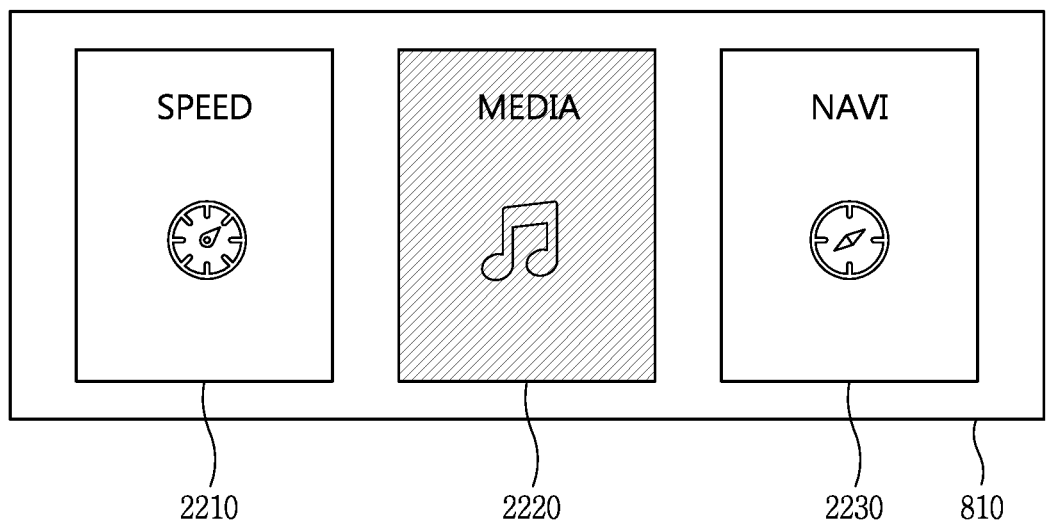
Figure 22B:
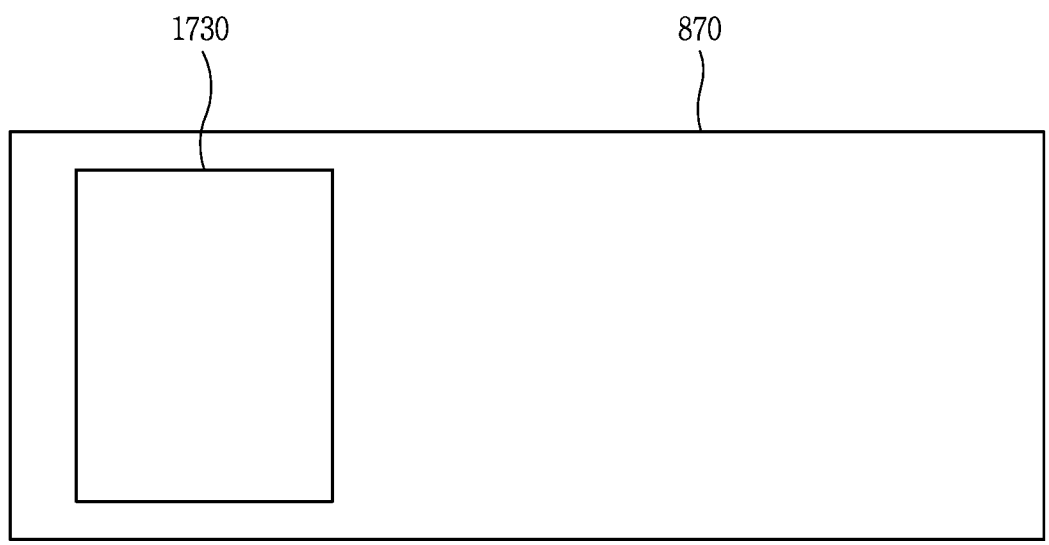
Figure 22B:
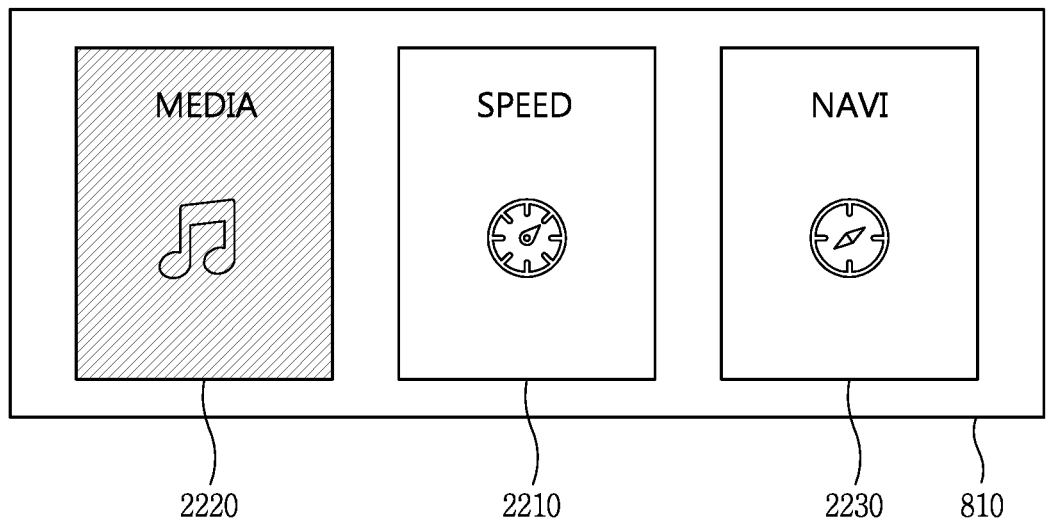

FIG. 21 is a flowchart illustrating a method of editing the first visual information output on the first display 810 based on the mounting area, and FIGS. 22A and 22B are flowcharts illustrating the control method of FIG. 21.

The 3D information display area 1710 may be set differently according to the mounting area 1730. Various kinds of information are provided in a 3D manner by the touch screen 1310. This is because a 3D effect can be properly realized only when the first visual information output on the first display 810 and the second visual information output on the touch screen 1310 overlap each other.

When the mobile terminal 1300 is mounted on the supporting unit 870, the first display 810 provides preset information in a 3D manner in cooperation with the touch screen 1310. At this time, an area (or the 3D information display area) in which the preset information is displayed on the first display 810 varies depending on the mounting area 1730.

Referring to FIG. 21, the display device 800 senses the mounting area 1730 where the mobile terminal 1300 is mounted on the supporting unit 870 (S2110).

Next, a plurality of graphic objects currently output on the first display 810 may be rearranged based on the mounting area 1730 (S2130).

For example, the first display 810 may output a home screen of the vehicle as the first visual information. The home screen may include a first portion 2210 for displaying speed information, a second portion 2220 for displaying a media content, and a third portion 2230 for displaying route guidance information using a map image.

Since the first portion 2210 and the third portion 2230 may be prohibited from outputting information in a 3D manner since these portions provide essential information that the driver of the vehicle should check. Therefore, only the second portion 2220 may be output in the 3D information display area.

As illustrated in FIG. 22A, when the mounting area 1730 is formed at a central portion of the supporting unit 870, the display device 800 may display the second portion 2220 at the central portion of the first display 810, and the first and third portions 2210 and 2230 at right and left sides of the second portion 2220.

On the other hand, as illustrated in FIG. 22B, when the mounting area 1730 is formed on a left area of the supporting unit 870, the display device 800 switches the first portion 2210 and the second portion 2220 to each other. A left area of the first display 810 is set as the 3D information display area by the mounting area 1730, and the second portion 2220 is output on the 3D information display area. The first and third portions 2210 and 2230 are displayed on the remaining area except for the output area of the second portion 2220.

Figure 23:
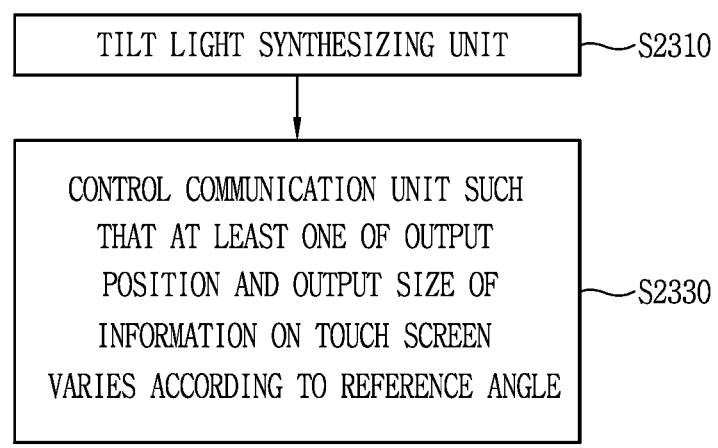
FIG. 23 is a flowchart illustrating a control method of tilting a light synthesizing unit based on a mounting area.

FIG. 23 is a flowchart illustrating a control method of tilting the light synthesizing unit based on the mounting area.

Referring to FIG. 23, the display device 800 may tilt the light synthesizing unit 830 such that an angle (i.e., a reference angle) between the first display 810 and the light synthesizing unit 830 is adjusted by using a driving unit 840 (S2310).

The display device 800 includes a driving unit 840 having a rotation shaft for providing power and the driving unit 840 is driven to vary the reference angle between the light synthesizing unit 830 and the first display 810 according to the mounting area. The contents related to the tilting have been described above with reference to FIGS. 8A to 8C, and thus description thereof will be omitted.

Assuming that the reference angle is fixed, the second visual information has different depth according to the mounting area 1730. This is because the distance between the light synthesizing unit 830 and the first display 810 increases from one end toward another end.

For example, assuming that the mounting area has fixed size and shape, the second visual information has a first depth value when the mounting area is located at a position adjacent to the one end, whereas the second visual information has a second depth value deeper than the first depth value when the mounting area is located at a position adjacent to the another end.

On the other hand, a depth value to be formed may be preset for the second visual information output on the touch screen 1310. In order to realize the preset depth value, the display device 800 controls the driving unit 840 such that the reference angle is changed based on the mounting area 1730.

Next, the display device 800 controls the communication unit 850 so that at least one of an output position and an output size of the information on the touch screen 1310 varies according to the reference angle.

As illustrated in FIG. 8C, even if a graphic object having the same size and shape is displayed at the same position of the touch screen 1310, an actual size and position of the graphic object that the user actually perceives varies according to the reference angle.

The display device 800 transmits a variable message to the mobile terminal 1300 so that the graphic object is output in the same size at the same position even if the reference angle is changed. In other words, the communication unit 850 transmits a variable message to the mobile terminal 1300 so that at least one of the output position and the output size of the second visual information on the touch screen 1310 can vary according to the reference angle.

Although not illustrated, the communication unit 850 may transmit the variable message to the mobile terminal 1300 such that at least one of the output position and the output size of the second visual information on the touch screen 1310 can vary according to speed of the vehicle 100. This is to control information provided through the light synthesizing unit 830 of the display device 800 to have different depth according to the speed, so that the driver can feel the speed of the vehicle 100 more realistically.

Figure 24:
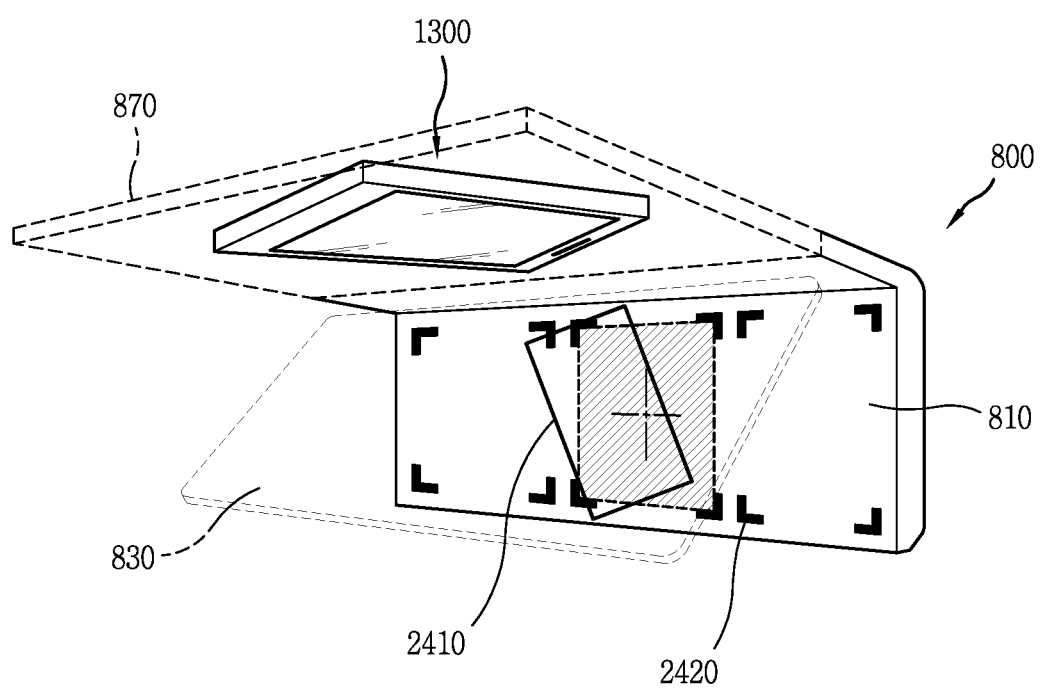
FIG. 24 is a conceptual view illustrating a display device for guiding a proper mounting position of a mobile terminal on a supporting unit.

FIG. 24 is a conceptual view illustrating a display device 800 for guiding an appropriate position of the mobile terminal on the supporting unit.

Due to the characteristic that the mobile terminal 1300 is mounted on the supporting unit 870, the mobile terminal 1300 may be likely to be improperly mounted in providing 3D information. In other words, in order to provide information in a 3D manner, the mounting area 1730 should be formed to satisfy a predetermined condition.

The first display 810 may output guide information 2410 and 2420 to guide a position of the mobile terminal 1300 to be mounted when the mounting area 1730 fails to satisfy the predetermined condition. For example, as illustrated in FIG. 24, the first display 810 may output thereon at least one of first guide information 2410 for guiding the mounting area 1730 and second guide information 2420 for guiding an optimal position to which the mobile terminal 1300 is to be moved.

Figure 25:
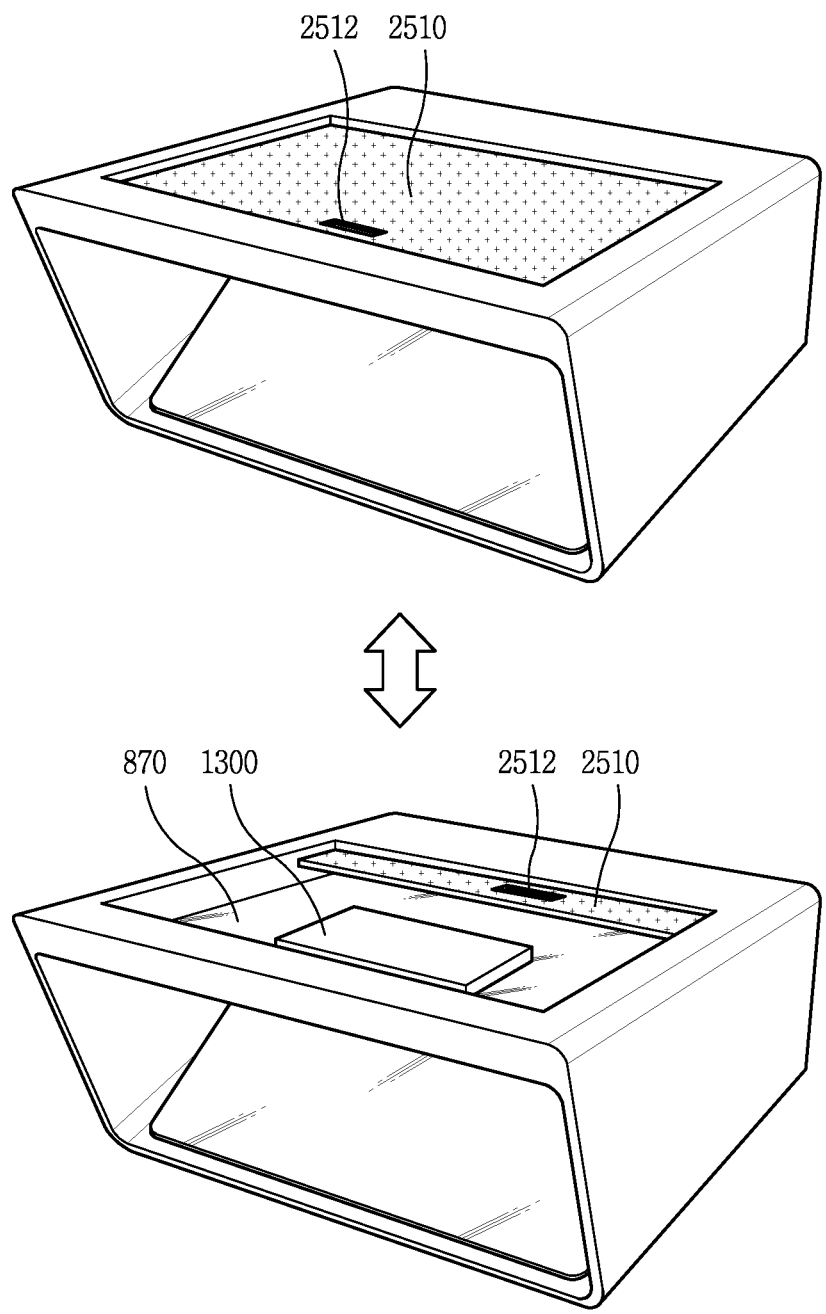
FIG. 25 is a conceptual view illustrating a cover for preventing unintended light from being incident on a supporting unit.

FIG. 25 is a conceptual view illustrating a cover for preventing unintended light from being incident on the supporting unit.

The supporting unit 870 may have at least part formed transparent such that the second light output from the touch screen 1310 is directed toward the light synthesizing unit 830. The at least part of the supporting unit 870 may not be obscured by the mobile terminal 1300 even if the mobile terminal 1300 is mounted on the supporting unit 870. In this case, unintended light may be incident on a portion of the supporting unit 870 without being covered by the mobile terminal 1300, and thereby cause disturbance to the light synthesizing unit 830.

In order to prevent such disturbance, the display device 800 may further include a cover 2510 that moves in a sliding manner or a tilting manner to protect, obscure or cover the supporting unit 870.

The cover 2510 is configured to open and close at least part of the supporting unit 870 to prevent external light from being incident on the light synthesizing unit 830 through the supporting unit 870. The display device 800 may further include a cover knob 2512 configured as a protrusion or a groove to facilitate the user to open and close the cover.

The display device 800 includes an accommodating portion formed on the supporting unit 870 to accommodate the mobile terminal 100 therein. The cover 2510 is configured to cover or not to cover the supporting unit 870 and the mobile terminal 1300 in a state where the mobile terminal 1300 is mounted on the supporting unit 870. In other words, the cover 2510 is configured to open and close the accommodating portion.

Figure 26:
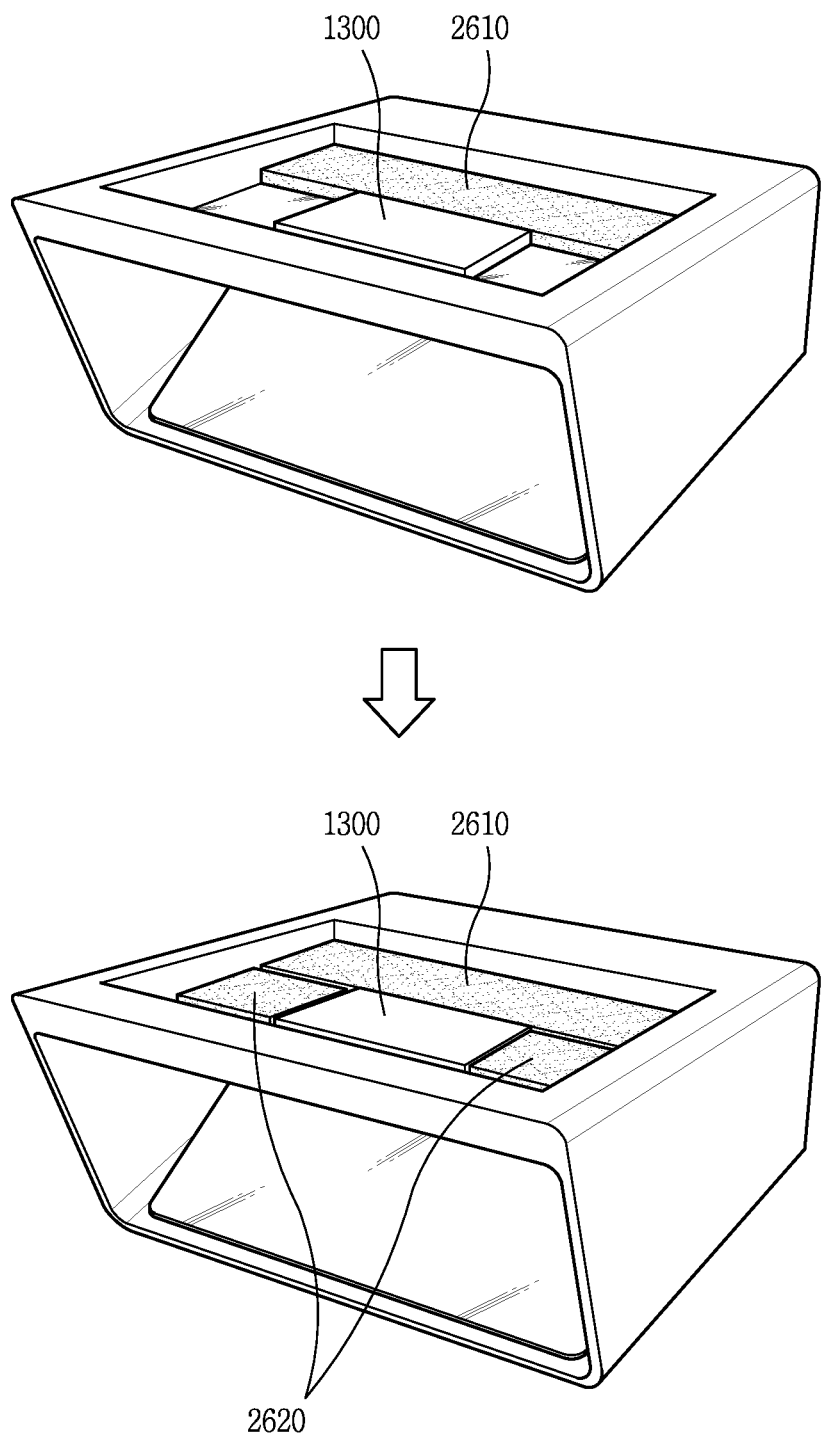
FIG. 26 is a conceptual view illustrating a display device capable of fixing a mobile terminal on a supporting unit.
Figure 27A:
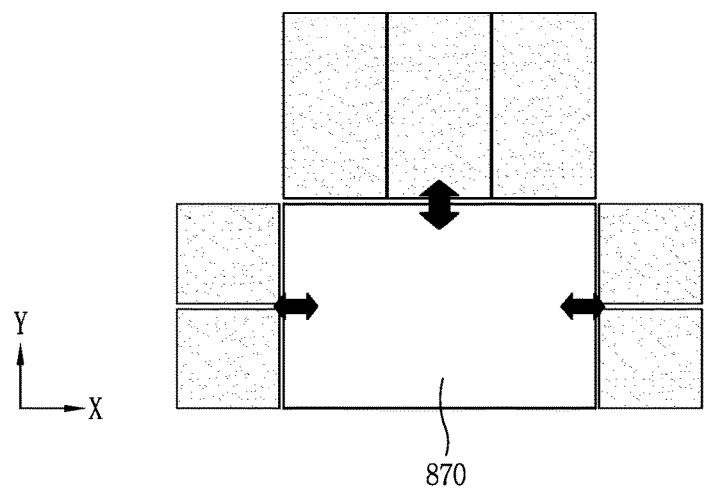
FIGS. 27A to 27C are conceptual views illustrating an operation of a fixing unit.
Figure 27B:
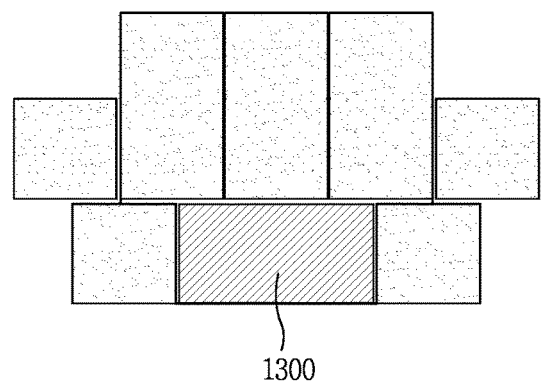
Figure 27C:
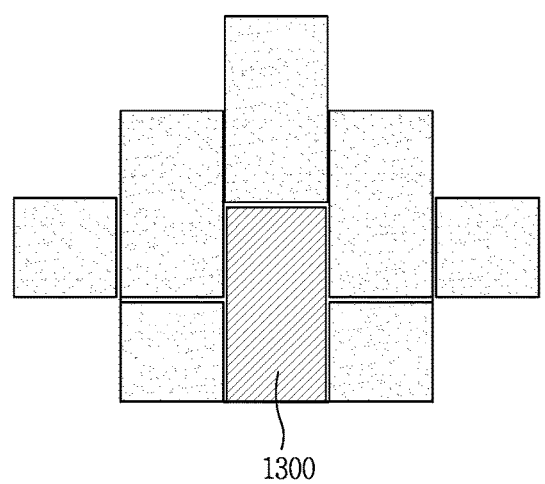

FIG. 26 is a conceptual view illustrating the display device 800 capable of fixing the mobile terminal on the supporting unit, and FIGS. 27A to 27C are conceptual views illustrating an operation of a fixing unit.

When the mobile terminal 1300 is mounted on the supporting unit 870, the position (or the mounting area) of the mobile terminal 1300 may vary according to a movement of the vehicle 100. Since a movement of the mobile terminal 1300 interferes with driving, the mobile terminal 1300 needs to be fixed on the supporting unit 870.

Therefore, the display device 800 may further include a fixing unit 2610, 2620 configured to fix the mobile terminal 1300 mounted on the supporting unit 870.

Further, the fixing unit 2610, 2620 may be configured to apply an external force to the mobile terminal so that the mobile terminal mounted on the supporting portion is moved to a predetermined position and fixed thereto.

The fixing unit 2610, 2620 may be hidden inside the display device 800 so as not to be exposed to the accommodating portion and then may be moved to the accommodating portion when the mobile terminal 1300 is mounted on the supporting unit 870.

For example, the fixing unit may include a first fixing portion 2610 provided on an upper end of the supporting unit 870 to be movable in a Y-axis direction, and a second fixing portion 2620 provided on a left end an/or a right end of the supporting unit 870 to be movable in an X-axis direction.

The mobile terminal 1300 is moved in the Y-axis direction by the movement of the first fixing portion 2610 and moved in the X-axis direction by the movement of the second fixing portion 2620. The display device 800 may move the mobile terminal 1300 to a predetermined position by moving the fixing unit (or the fixing portions).

As illustrated in FIGS. 27B and 27C, when the first and second fixing portions 2610 and 2620 stop moving, the mobile terminal 1300 is fixed between the first and second fixing portions 2610 and 2620.

Figure 28A:
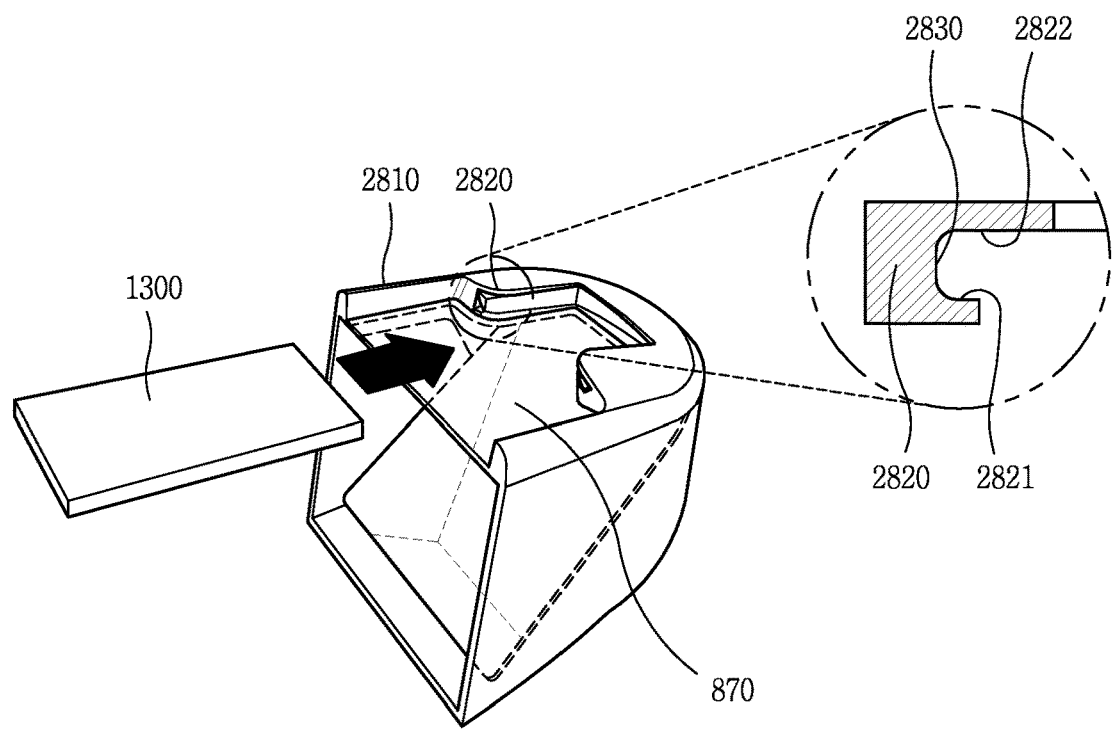
FIGS. 28A and 28B are exemplary views illustrating a display device for fixing a mobile terminal.
Figure 28B:
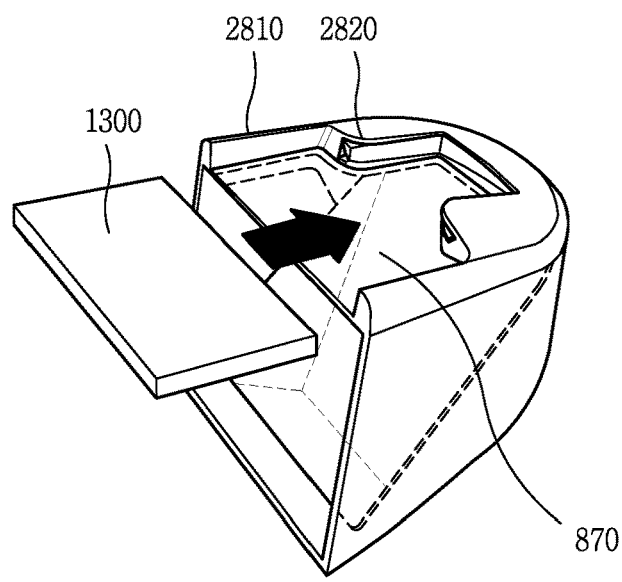

FIGS. 28A and 28B are exemplary views illustrating the display device 800 for fixing the mobile terminal 1300.

The display device 800 includes a first guide portion 2810 for guiding the mobile terminal 1300 to be inserted in a landscape (horizontal) mode, and a second guide portion 2820 for guiding the mobile terminal 1300 to be inserted in a portrait (vertical) mode.

As illustrated in FIG. 28A, when the mobile terminal 1300 is inserted into the second guide portion 2820, the mobile terminal 1300 may operate in the portrait mode.

As illustrated in FIG. 28B, when the mobile terminal 1300 is inserted into the first guide portion 2810, the mobile terminal 1300 may operate in the landscape mode.

The first and second guide portions 2810 and 2820 may have the same structure, and the second guide portion 2820 will be exemplarily described in detail.

The second guide portion 2820 is configured such that the mobile terminal 1300 is inserted therein in a sliding manner. In addition, the second guide portion 2820 may be provided with a supporter disposed at one end thereof for limiting a sliding motion of the mobile terminal 1300.

The second guide portion 2820 includes a first part 2821 with which a part of the front surface of the mobile terminal 1300 is brought into contact, a second part 2822 with which a part of the rear surface of the mobile terminal 1300 is brought into contact, and a third part 2823 connecting the first part 2821 and the second part 2822 and formed in a curved shape.

The first part 2821 is formed so as not to obscure the touch screen 1310 of the mobile terminal 1300. For example, the first part 2821 may have a width of 20 to 50 mm. This corresponds to a bezel size of the mobile terminal 1300.

A connection port (not illustrated) connected to the mobile terminal 1300 by wire may be provided on a part of the supporter which is brought into contact with the mobile terminal 1300 when the mobile terminal 1300 is inserted. Alternatively, the supporter may be provided with a sensor for detecting that the mobile terminal 1300 is inserted.

Although not illustrated, the supporting unit 870 of the display device 800 may have a grip structure capable of holding a part of the mobile terminal. For example, the supporting unit 870 may include a first grip portion for gripping one end of the mobile terminal 1300 and a second grip portion for gripping another end of the mobile terminal 1300. The user can fix the mobile terminal 1300 such that the touch screen 1310 of the mobile terminal 1300 faces the light synthesizing unit 830 using the supporting unit of the grip structure.

The display device 800 may have a structure such as tray loading or slot loading of a CD player.

For the tray loading, the supporting unit 870 serves as a tray for moving the mobile terminal 1300. Specifically, the supporting unit 870 may be positioned inside the display device 800 and may protrude to outside of the display device 800. When the mobile terminal 1300 is mounted on the supporting unit 870, the supporting unit 870 is inserted back into the display device 800, and the touch screen 1310 of the mobile terminal 1300 faces the light synthesizing unit 830.

For the slot loading, the display device 800 has a slot into which the mobile terminal 1300 is inserted. A mechanical device for automatically moving the mobile terminal 1300 is provided in the display device 800 so as to move the mobile terminal 1300 to the inside and the outside of the display device 800.

Figure 29:
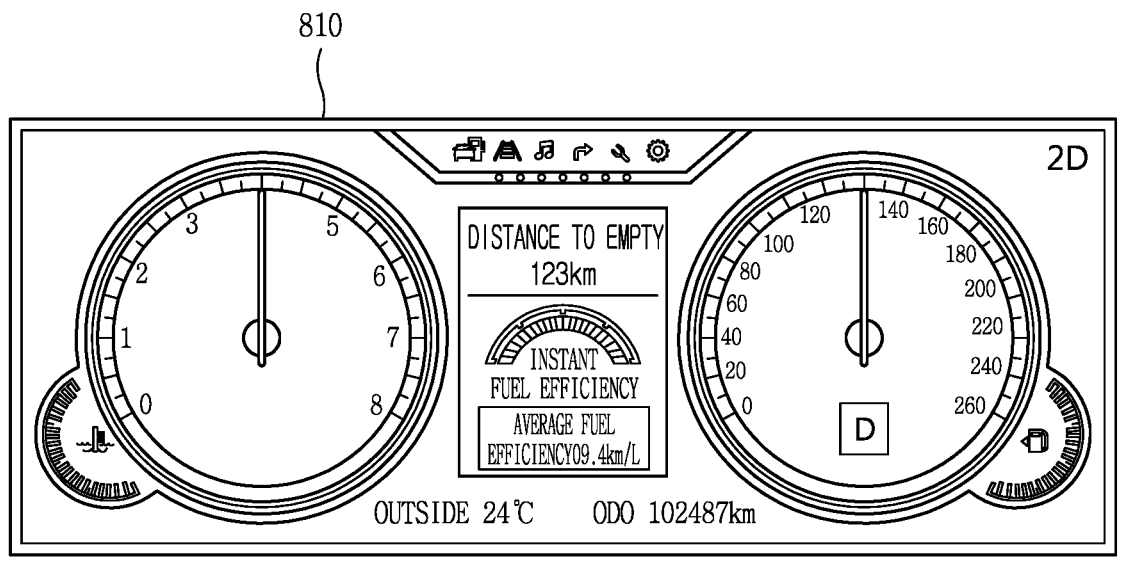
FIG. 29 is an exemplary view illustrating a display device that outputs information related to a mobile terminal on a first display.
Figure 29:
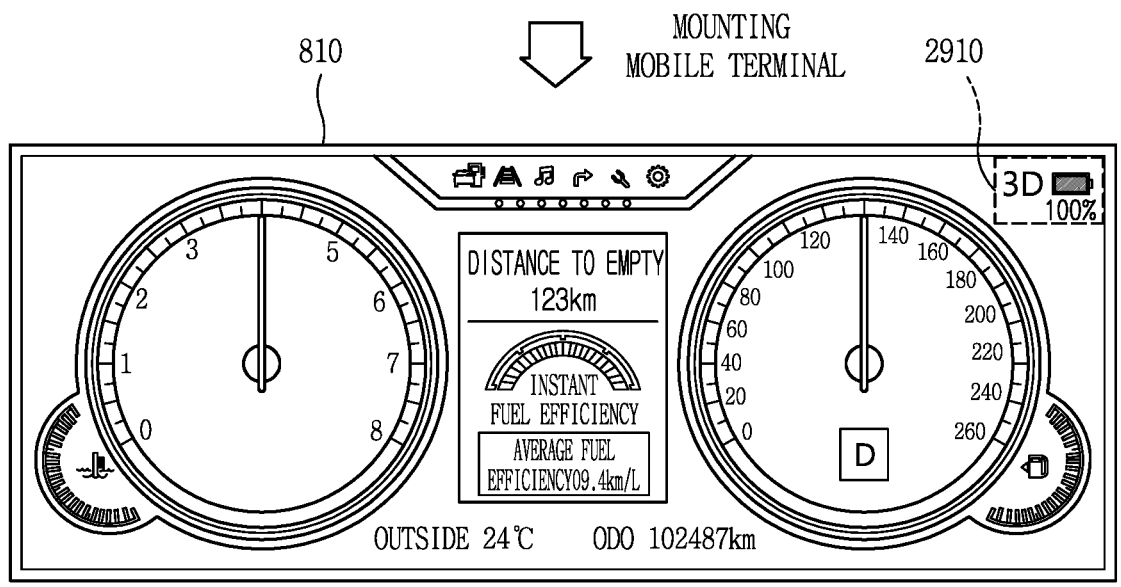

FIG. 29 is an exemplary view illustrating the display device that outputs information related to the mobile terminal on the first display.

When the display device 800 which is outputting information in a 2D manner outputs information in a 3D manner, namely, when an information output manner is changed from the 2D manner to the 3D manner, the display device 800 may additionally display information 2910 related to the mobile terminal on the first display 810 based on information received from the mobile terminal 1300.

The first visual information is output on the first display 810. When the power supply unit supplies power to the mobile terminal 1300, the first display 810 additionally outputs the mobile terminal-related information 2910 on the first visual information based on the information received from the mobile terminal 1300.

The mobile terminal-related information may include a battery level of the mobile terminal 1300, and event information occurred in the mobile terminal 1300.

Figure 30A:
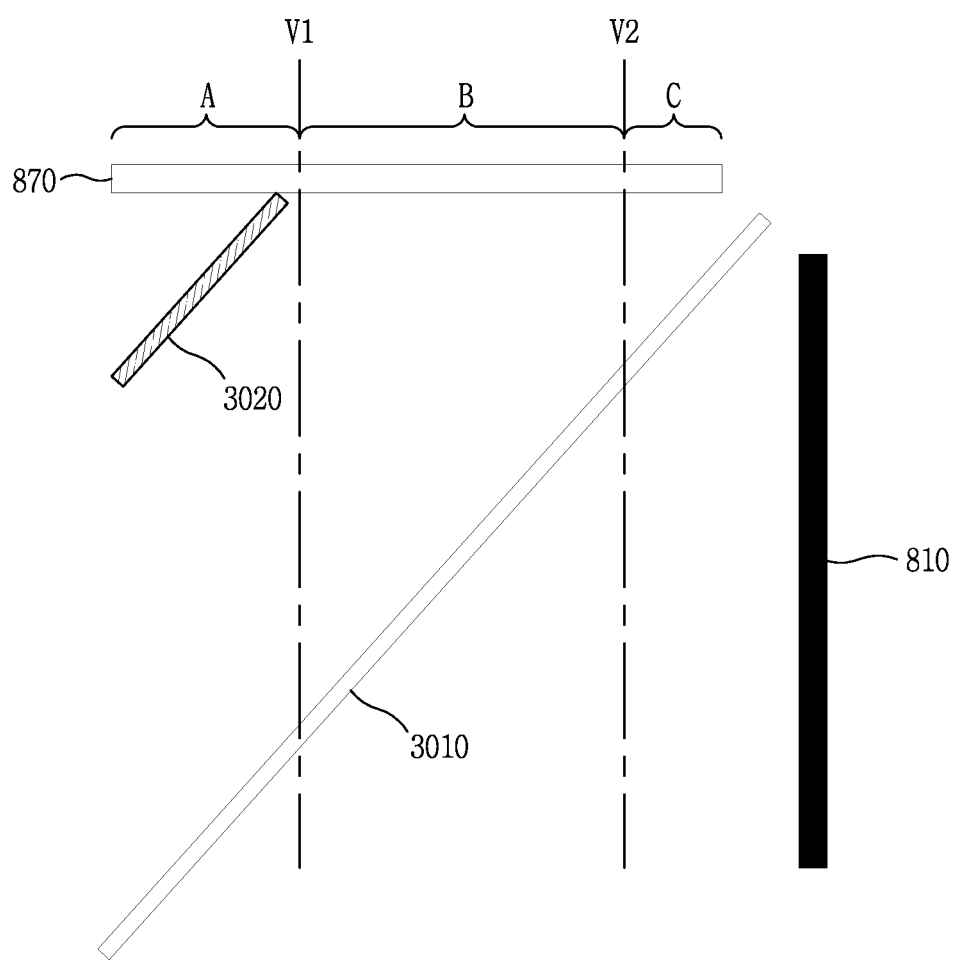
FIGS. 30A to 30C are conceptual views illustrating a display device provided with a plurality of light synthesizing portions.
Figure 30B:
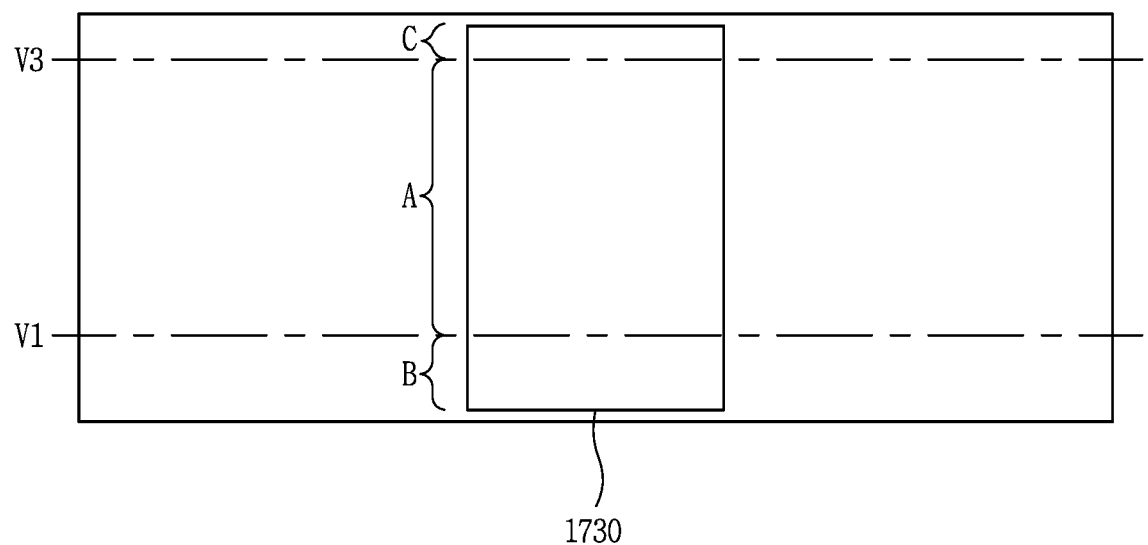
Figure 30C:
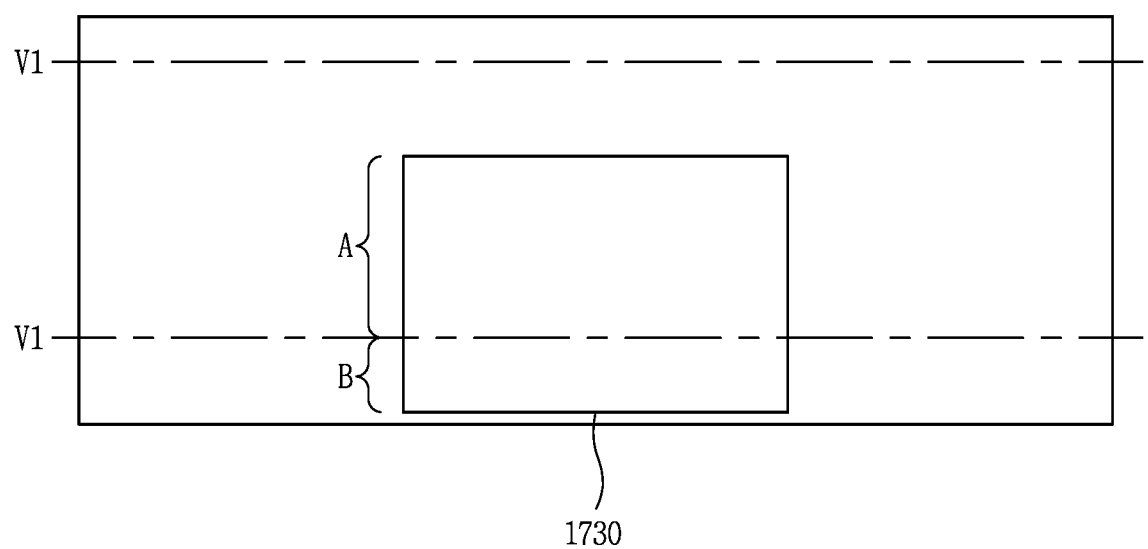

FIGS. 30A to 30C are conceptual views illustrating the display device provided with a plurality of light synthesizing portions.

According to one embodiment disclosed herein, the light synthesizing unit 830 may include first and second light synthesizing portions 3010 and 3020 disposed with being spaced apart from each other.

For first and second information to be output on the mobile terminal 1300, at least one of a first area B corresponding to the first information and a second area A corresponding to the second information, of the entire area of the touch screen 1310, is calculated based on the mounting area 1730, such that the first information is reflected by the first light synthesizing portion 3010 and the second information is reflected by the second light synthesizing portion 3020.

As illustrated in FIG. 30A, an entire area of the supporting unit 870 may be divided into three areas A, B, and C that are spaced apart from one another. Specifically, the first area B and the second area A are divided by one end of the second light synthesizing portion 3020, and the first area B and the third area C are divided by another end of the second light synthesizing portion 3020.

A first virtual line V1 that divides the first area B and the second area A is calculated by the one end of the second light synthesizing portion 3020, and a second virtual line V2 that divides the first area B and the third area C is calculated by the another end of the second light synthesizing portion 3020.

The first area B is an area where output light is reflected by the first light synthesizing portion 3010 and the second area A is an area where the output light is reflected by the second light synthesizing portion 3020. The third area C, is an area where the first and second light synthesizing portions 3010 and 3020 overlap each other, namely, an area where an information output is restricted because different kinds of information are likely to be output in an overlapping manner.

The display device 800 divides the mounting area 1730 into at least one of the first to third areas A, B, and C when the mounting area 1730 is sensed. The display device 800 controls the communication unit 850 such that the first information is output on the first area B, the second information is output on the second area A, and any information is not output on the third area C.

The communication unit 850 transmits information related to the calculated at least one to the mobile terminal 1300. The mobile terminal 1300 controls the touch screen 1310 based on the information transmitted through the communication unit 850.

The operations of the display device 800 of the present invention described above with reference to FIGS. 8A to 30C may extend up to the vehicle 100 provided with the display device 800. Further, the operations of the display device 800 may also be implemented by a control method of an application that controls at least one of the display device 800 and the mobile terminal 1300.

Specifically, the application senses whether the mobile terminal 1300 is supported by the supporting unit 870 of the display device 800. When the mobile terminal 1300 is supported by the supporting unit 870, the application controls at least one of the display device 800 and the mobile terminal 1300 such that the display device 800 and the mobile terminal 1300 cooperatively provide preset vehicle driving information in a 3D manner.

The application transmits a first message to the display device 800 so that a part of the vehicle driving information is displayed on the first display 810 and transmits a second message to the mobile terminal 1300 so that another part of the vehicle driving information is displayed on the touch screen 1310.

The application may select the information output permissible area 1720 of the entire area of the touch screen 1310 based on the mounting area 1730 where the mobile terminal 1300 is mounted on the supporting unit 870. In this case, the another part of the vehicle driving information is output within the selected information output permissible area 1720.

The application may select the 3D information display area 1710 of the entire area of the first display 810 based on the mounting area 1370 where the mobile terminal 1300 is mounted on the supporting unit 870. The part of the vehicle driving information is output in the selected 3D information display area 1710.

The application controls the touch screen 1310 to be turned on or off according to a direction that the touch screen 1310 faces when the mobile terminal 1300 is mounted on the supporting unit 870.

The application may adjust the reference angle between the light synthesizing unit 830 and the first display 810 according to the mounting area 1730 where the mobile terminal 1300 is mounted on the supporting unit 870.

The present invention can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display device for use in a vehicle and configured to perform communication with at least one processor provided in the vehicle, the display device comprising:
   a first display configured to output a first light to provide first visual information;
   a support configured to support a mobile terminal having a second display configured to output a second light to provide second visual information, the support having at least one end spaced from the first display, and at least a portion of the support brought into contact with the second display of the mobile terminal is transparent; and a light synthesizer configured to transmit one of the first light and the second light therethrough and to reflect the other of the first light and the second light, the light synthesizer being interposed between the first display and the support, wherein, when the mobile terminal is located on the support such that the second display faces the support, the second light is directed towards the light synthesizer.

2. The display device of claim 1, wherein the support is configured to support a front surface of the mobile terminal such that the second display of the mobile terminal forms an acute angle with the light synthesizer.

3. The display device of claim 1, further comprising a communication unit configured to perform communication with the mobile terminal,
wherein the communication unit is configured to transmit a message to the mobile terminal such that the second visual information is output on the second display when the mobile terminal is mounted on the support.

4. The display device of claim 3, wherein the message includes vehicle driving information generated by the at least one processor provided in the vehicle.

5. The display device of claim 4, wherein the communication unit is configured to transmit a variable message to the mobile terminal so that at least one of an output position and an output size of the second visual information on the second display is varied according to a speed of the vehicle.

6. The display device of claim 3, further comprising a sensor configured to sense a mounting area corresponding to where the mobile terminal is mounted on the support.

7. The display device of claim 6, wherein an information output permissible area that is less than an entire area of the second display for outputting the second visual information is calculated based on an orientation of the mobile terminal in the sensed mounting area, and
wherein the communication unit is configured to transmit information corresponding to the information output permissible area to the mobile terminal to control the mobile terminal such that the second visual information is output in the information output permissible area.

8. The display device of claim 6, wherein the first display is configured to provide preset information in a three-dimensional manner in cooperation with the second display when the mobile terminal is mounted on the support,
wherein an output area of the preset information on the first display is varied according to the sensed mounting area, and
wherein the preset information includes the first visual information.

9. The display device of claim 6, wherein the communication unit is configured to transmit a different message to the mobile terminal to control the mobile terminal so that at least one of an output position and an output size of the second visual information output on the second display is varied according to the sensed mounting area.

10. The display device of claim 6, wherein the communication unit is configured to transmit a different message to the mobile terminal to control the mobile terminal such that the second visual information output on the second display is varied according to the sensed mounting area.

11. The display device of claim 6, wherein the second visual information output on the second display is varied according to an orientation of the mobile terminal mounted on the support relative to the sensed mounting area.

12. The display device of claim 6, wherein the light synthesizer comprises first and second light synthesizing portions spaced apart from each other,
wherein the second visual information to be output by the mobile terminal includes first information and second information,
wherein at least one of a first area corresponding to the first information and a second area corresponding to the second information is determined based on the sensed mounting area such that the first information is reflected by the first light synthesizing portion and the second information is reflected by the second light synthesizing portion, and
wherein the communication unit is configured to transmit information related to the determined at least one of the first area and the second area to the mobile terminal.

13. The display device of claim 6, wherein, when the second visual information is output on the second display, the first visual information output on the first display varies according to a position of the mobile terminal relative to the sensed mounting area.

14. The display device of claim 6, further comprising a driving unit having a rotation shaft coupled to the light synthesizer such that the light synthesizer is tiltable between the first display and the support,
wherein the driving unit is configured to be driven to change a reference angle between the light synthesizer and the first display according to the sensed mounting area.

15. The display device of claim 14, wherein the communication unit is configured to transmit a variable message to the mobile terminal to control the mobile terminal such that at least one of an output position and an output size of the second visual information on the second display is varied according to the reference angle.

16. The display device of claim 6, wherein the first display is configured to output guide information to assist in positioning of the mobile terminal on the support unit when the mounting area fails to satisfy a predetermined condition.

17. The display device of claim 6, further comprising a processor configured to:
control the first display to output third visual information corresponding to an event; and
when the event occurs while the first visual information is output on the first display and the second visual information is output on the second display, control the communication unit such that fourth visual information corresponding to the event is output on the second display.

18. The display device of claim 1, further comprising a communication unit configured to perform communication with the mobile terminal,
wherein the communication unit is configured to selectively transmit a message based on a direction that the second display is facing when the mobile terminal is mounted on the support.

19. The display device of claim 1, further comprising a fixing unit configured to fix the mobile terminal to the support.

20. The display device of claim 19, wherein the fixing unit is configured to apply an external force to the mobile terminal such that the mobile terminal mounted on the support is moved to a predetermined position and fixed thereto.

21. The display device of claim 1, further comprising a cover configured to cover and uncover at least a portion of the support such that external light is prevented from being incident on the light synthesizer through the support.

22. The display device of claim 1, further comprising a power supply configured to supply power to the mobile terminal when the mobile terminal is mounted on the support.

23. The display device of claim 22, wherein the first display is configured to output mobile terminal-related information as part of the first visual information based on information received from the mobile terminal when the power supply supplies power to the mobile terminal.

24. A control method of an application for controlling the display device of claim 1 and a mobile terminal mounted on the display device, the method comprising:
  sensing whether the mobile terminal is mounted on the support of the display device using a sensor provided in the at least one of the display device and or the mobile terminal; and
  controlling at least one of the mobile terminal and the display device so that the display device and the mobile terminal cooperatively provide vehicle driving information in a three-dimensional manner when the mobile terminal is mounted on the support.

25. The method of claim 24, wherein controlling the at least one of the mobile terminal and the display device includes:
  transmitting a first message to the display device such that a part of the vehicle driving information is output on the first display; and
  transmitting a second message to the mobile terminal such that another part of the vehicle driving information is output on the second display.

26. The method of claim 25, further comprising selecting an information output permissible area from an entire area of the second display based on a mounting area where the mobile terminal is mounted on the support,
  wherein the another part of the vehicle driving information is output in the selected information output permissible area.

27. The method of claim 25, further comprising selecting an information output permissible area from an entire area of the first display based on a mounting area where the mobile terminal is mounted on the support,
  wherein the part of the vehicle driving information is output in the selected information output permissible area.

28. The method of claim 25, further comprising controlling the second display to be turned on or off according to a direction that the second display faces relative to the support when the mobile terminal is mounted on the support.

29. The method of claim 25, wherein the light synthesizer is configured to be tilted between the first display and the support, and
  wherein the method further comprises adjusting a reference angle between the light synthesizer and the first display according to a mounting area where the mobile terminal is mounted on the support.

* * * * *